United States Patent [19]
Arai et al.

[11] Patent Number: 5,917,519
[45] Date of Patent: Jun. 29, 1999

[54] INK JET RECORDING METHOD AND APPARATUS FOR RECORDING WITH MULTIPLE THINNED IMAGES

[75] Inventors: Atsushi Arai, Kawasaki; Hiromitsu Hirabayashi, Yokohama; Shigeyasu Nagoshi, Kawasaki; Yuji Akiyama; Hitoshi Sugimoto, both of Yokohama; Miyuki Matsubara, Tokyo, all of Japan

[73] Assignee: Canon Kabushiki Kaisha, Tokyo, Japan

[21] Appl. No.: 08/360,363

[22] Filed: Dec. 21, 1994

Related U.S. Application Data

[62] Division of application No. 07/888,814, May 27, 1992, abandoned.

[30] Foreign Application Priority Data

| May 31, 1991 | [JP] | Japan | 3-129500 |
| May 31, 1991 | [JP] | Japan | 3-129501 |

[51] Int. Cl.⁶ ........................................ B41J 2/21
[52] U.S. Cl. ........................ 347/41; 347/9; 347/14; 347/37; 347/43; 347/102
[58] Field of Search ............... 347/40, 41, 43, 347/14, 9, 37, 102, 237

[56] References Cited

U.S. PATENT DOCUMENTS

| 4,087,825 | 5/1978 | Chen et al. ........................ 346/75 |
| 4,178,597 | 12/1979 | Isayama et al. .................. 346/75 |
| 4,313,124 | 1/1982 | Hara ................................ 346/140 R |
| 4,345,262 | 8/1982 | Shirato et al. .................. 346/140 R |
| 4,459,600 | 7/1984 | Sato et al. ....................... 346/140 R |
| 4,463,359 | 7/1984 | Ayata et al. ...................... 346/1.1 |
| 4,469,026 | 9/1984 | Irwin ................................ 347/102 |
| 4,558,333 | 12/1985 | Sugitani et al. ................. 346/140 R |
| 4,596,995 | 6/1986 | Yamakawa et al. ................ 347/237 |
| 4,723,129 | 2/1988 | Endo et al. ....................... 346/1.1 |
| 4,740,796 | 4/1988 | Endo et al. ....................... 346/1.1 |
| 4,860,026 | 8/1989 | Matsumoto et al. ............. 346/1.1 |
| 4,963,882 | 10/1990 | Michman .......................... 346/1.1 |
| 4,992,806 | 2/1991 | Peer ................................. 346/140 R |
| 5,075,689 | 12/1991 | Hoisington et al. .............. 347/41 |
| 5,155,503 | 10/1992 | Tasabi et al. ..................... 346/140 R |
| 5,166,699 | 11/1992 | Yano et al. ........................ 347/37 |
| 5,365,256 | 11/1994 | Takahashi ......................... 347/102 |

FOREIGN PATENT DOCUMENTS

| 0300743 | 1/1989 | European Pat. Off. . |
| 0348181 | 12/1989 | European Pat. Off. . |
| 54-056847 | 5/1979 | Japan . |
| 13445 | 1/1982 | Japan ........................... 347/43 |
| 59-123670 | 7/1984 | Japan . |
| 59-138461 | 8/1984 | Japan . |
| 60-071260 | 4/1985 | Japan . |
| 1120356 | 5/1989 | Japan . |

*Primary Examiner*—Valerie Lund
*Attorney, Agent, or Firm*—Fitzpatrick, Cella, Harper & Scinto

[57] ABSTRACT

A plurality of thin image data are generated based on desired image data. A single region on a recording medium is scanned a plurality of number of times on the basis of the plurality of thin image data, thereby recording the thin images a plurality of number of times. The scan interval in this case is set to be an interval equal to or longer than a required minimum interval, which does not cause deterioration of image quality due to blurring. Furthermore, the interval is properly changed according to the print duty, environmental condition, or the like.

31 Claims, 20 Drawing Sheets

FIG. 2

| NUMBER OF TIMES OF PRINT PASSES | REQUIRED MINIMUM PASS INTERVAL (SECOND) |
|---|---|
| 2 | 3 |
| 3 | 2 |
| 4 | 1 |
| 5 | 0.5 |

FIG. 4

| NUMBER OF TIMES OF PRINT PASSES | REQUIRED MINIMUM PASS INTERVAL (SECOND) |
|---|---|
| 2 | 6 |
| 3 | 4 |
| 4 | 3 |
| 5 | 2 |
| 6 | 1 |
| 7 | 0.8 |
| 8 | 0.5 |

FIG. 6

| NUMBER OF TIMES OF PRINT PASSES | REQUIRED MINIMUM PASS INTERVAL (SECOND) |
|---|---|
| 4 | 6 |
| 8 | 3 |
| 12 | 1 |
| 16 | 0.5 |

FIG. 9

| MAX PRINT DUTY | MULTI-PASS INTERVAL | CONTROL SIG |
|---|---|---|
| $\frac{1}{9}$ | $\frac{1}{9}$ | 1 |
| $\frac{2}{9}$ | $\frac{2}{9}$ | 2 |
| $\frac{3}{9}$ | $\frac{3}{9}$ | 3 |
| $\frac{4}{9}$ | $\frac{4}{9}$ | 4 |
| $\frac{5}{9}$ | $\frac{5}{9}$ | 5 |
| $\frac{6}{9}$ | $\frac{6}{9}$ | 6 |
| $\frac{7}{9}$ | $\frac{7}{9}$ | 7 |
| $\frac{8}{9}$ | $\frac{8}{9}$ | 8 |
| $\frac{9}{9}$ | $\frac{9}{9}$ | 9 |

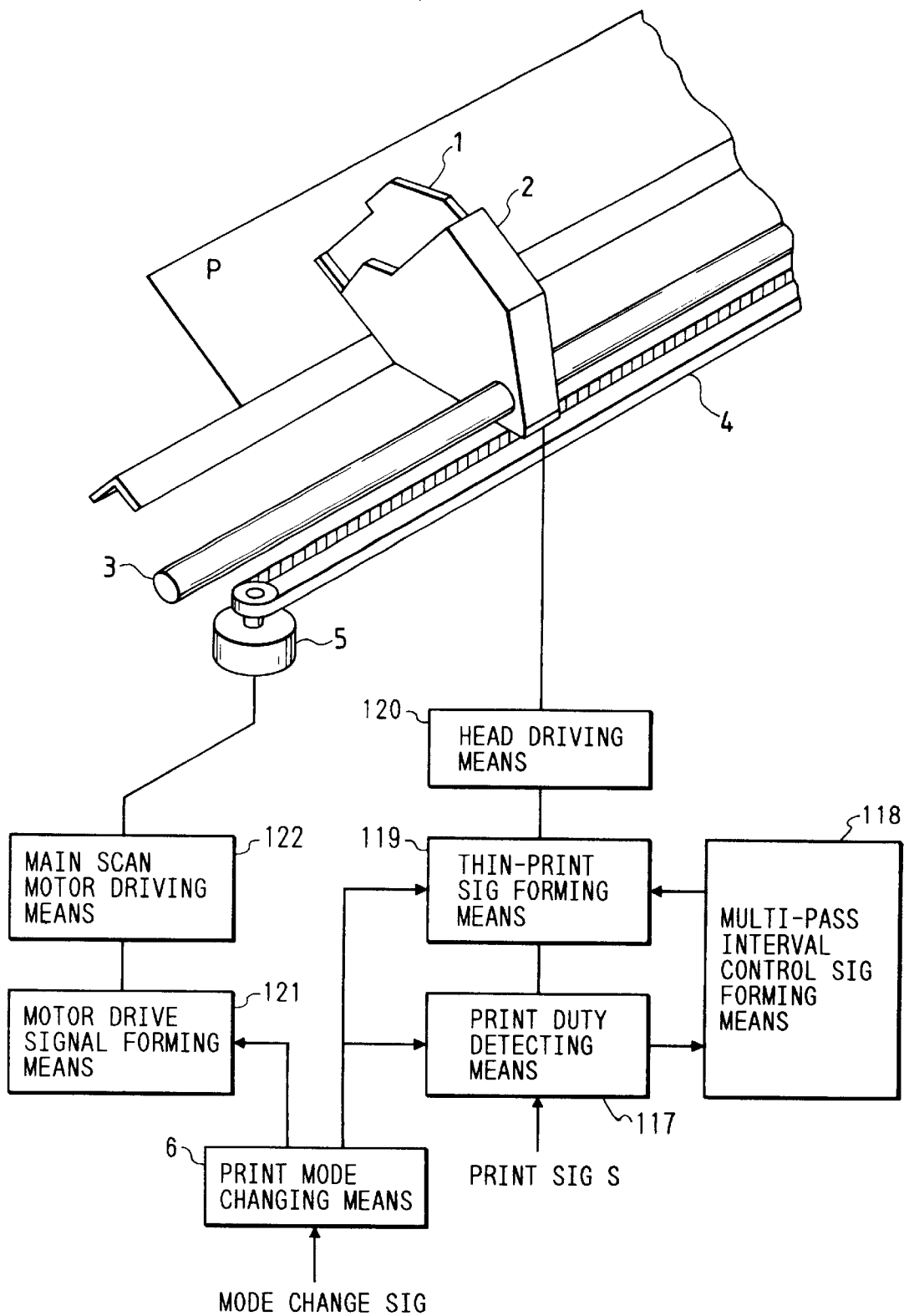

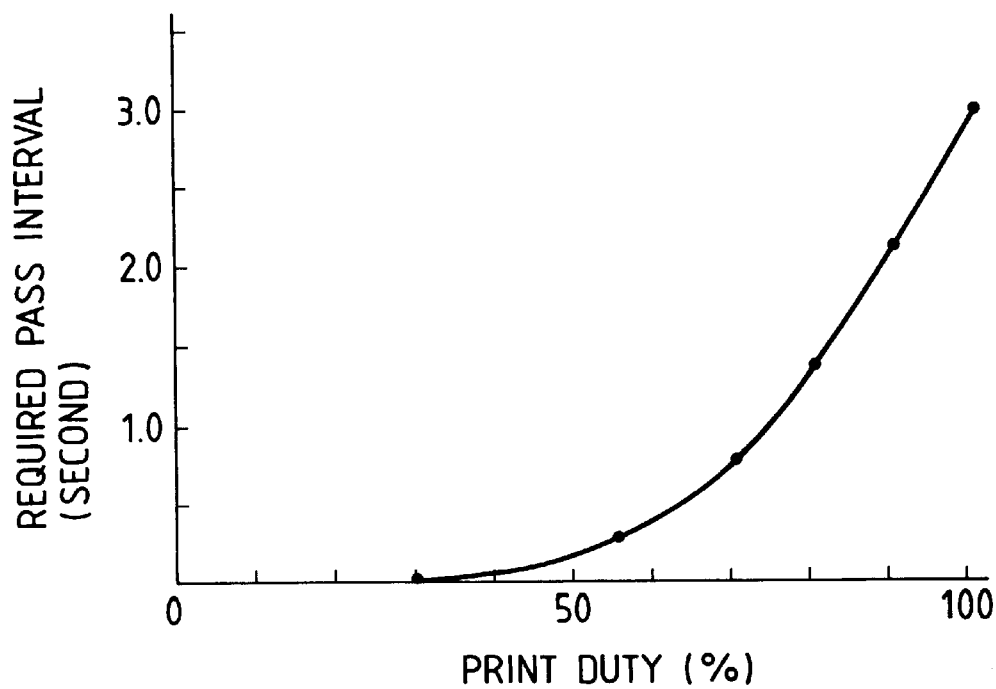

FIG. 13A (K)

| | | |
|---|---|---|
| 3/9 | 5/9 | 0/9 |
| 2/9 | 1/9 | 0/9 |
| 0/9 | 3/9 | 0/9 |
| 1/9 | 9/9 | 8/9 |
| 6/9 | 9/9 | 7/9 |
| 5/9 | 9/9 | 4/9 |
| 5/9 | 9/9 | 3/9 |
| 5/9 | 6/9 | 2/9 |
| 3/9 | 4/9 | 1/9 |
| 2/9 | 2/9 | 1/9 |
| 1/9 | 2/9 | 1/9 |

FIG. 13B (C)

| | | |
|---|---|---|
| 0/9 | 0/9 | 0/9 |
| 0/9 | 0/9 | 0/9 |
| 0/9 | 0/9 | 0/9 |
| 0/9 | 0/9 | 0/9 |
| 0/9 | 0/9 | 0/9 |
| 0/9 | 0/9 | 0/9 |
| 4/9 | 4/9 | 4/9 |
| 4/9 | 4/9 | 4/9 |
| 4/9 | 4/9 | 4/9 |
| 4/9 | 4/9 | 4/9 |
| 4/9 | 4/9 | 4/9 |

FIG. 13C (M)

| | | |
|---|---|---|
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |
| 1/9 | 0/9 | 1/9 |

FIG. 13D

| | | |
|---|---|---|
| $\frac{5}{9}$ | $\frac{0}{9}$ | $\frac{0}{9}$ |
| $\frac{0}{9}$ | $\frac{5}{9}$ | $\frac{0}{9}$ |
| $\frac{0}{9}$ | $\frac{0}{9}$ | $\frac{5}{9}$ |
| $\frac{0}{9}$ | $\frac{5}{9}$ | $\frac{0}{9}$ |
| $\frac{5}{9}$ | $\frac{0}{9}$ | $\frac{0}{9}$ |
| $\frac{0}{9}$ | $\frac{5}{9}$ | $\frac{0}{9}$ |
| $\frac{0}{9}$ | $\frac{0}{9}$ | $\frac{5}{9}$ |
| $\frac{0}{9}$ | $\frac{5}{9}$ | $\frac{0}{9}$ |
| $\frac{5}{9}$ | $\frac{0}{9}$ | $\frac{0}{9}$ |
| $\frac{0}{9}$ | $\frac{0}{9}$ | $\frac{5}{9}$ |
| $\frac{0}{9}$ | $\frac{5}{9}$ | $\frac{0}{9}$ |
| $\frac{0}{9}$ | $\frac{0}{9}$ | $\frac{5}{9}$ |

| | | |
|---|---|---|
| $\frac{6}{9}$ | $\frac{5}{9}$ | $\frac{4}{9}$ |
| $\frac{1}{9}$ | $\frac{6}{9}$ | $\frac{3}{9}$ |
| $\frac{1}{9}$ | $\frac{3}{9}$ | $\frac{6}{9}$ |
| $\frac{8}{9}$ | $\frac{14}{9}$ | $\frac{2}{9}$ |
| $\frac{13}{9}$ | $\frac{9}{9}$ | $\frac{7}{9}$ |
| $\frac{5}{9}$ | $\frac{14}{9}$ | $\frac{6}{9}$ |
| $\frac{8}{9}$ | $\frac{13}{9}$ | $\frac{15}{9}$ |
| $\frac{7}{9}$ | $\frac{15}{9}$ | $\frac{10}{9}$ |
| $\frac{11}{9}$ | $\frac{8}{9}$ | $\frac{8}{9}$ |
| $\frac{6}{9}$ | $\frac{11}{9}$ | $\frac{7}{9}$ |
| $\frac{6}{9}$ | $\frac{6}{9}$ | $\frac{11}{9}$ |

MIXED COLOR

| PRINT INK DENSITY | MULTI-PASS INTERVAL |
|---|---|
| 200 OR MORE | 6s |
| 156 – UNDER 184 | 4s |
| 50 – UNDER 156 | 2s |
| UNDER 50 | 0s |

| RELATIVE HUMIDITY (%) | MULTI-PASS INTERVAL |
|---|---|
| UNDER 10% | 1 |
| 10% - UNDER 30% | 2 |
| 30% - UNDER 60% | 3 |
| 60% - UNDER 80% | 4 |
| 80% - UNDER 90% | 5 |
| 90% OR MORE | 6 |

| RELATIVE HUMIDITY (%) | MULTI-PASS INTERVAL |
|---|---|
| UNDER 30% | 3s |
| 30% - UNDER 70% | 5s |
| 70% OR MORE | 6s |

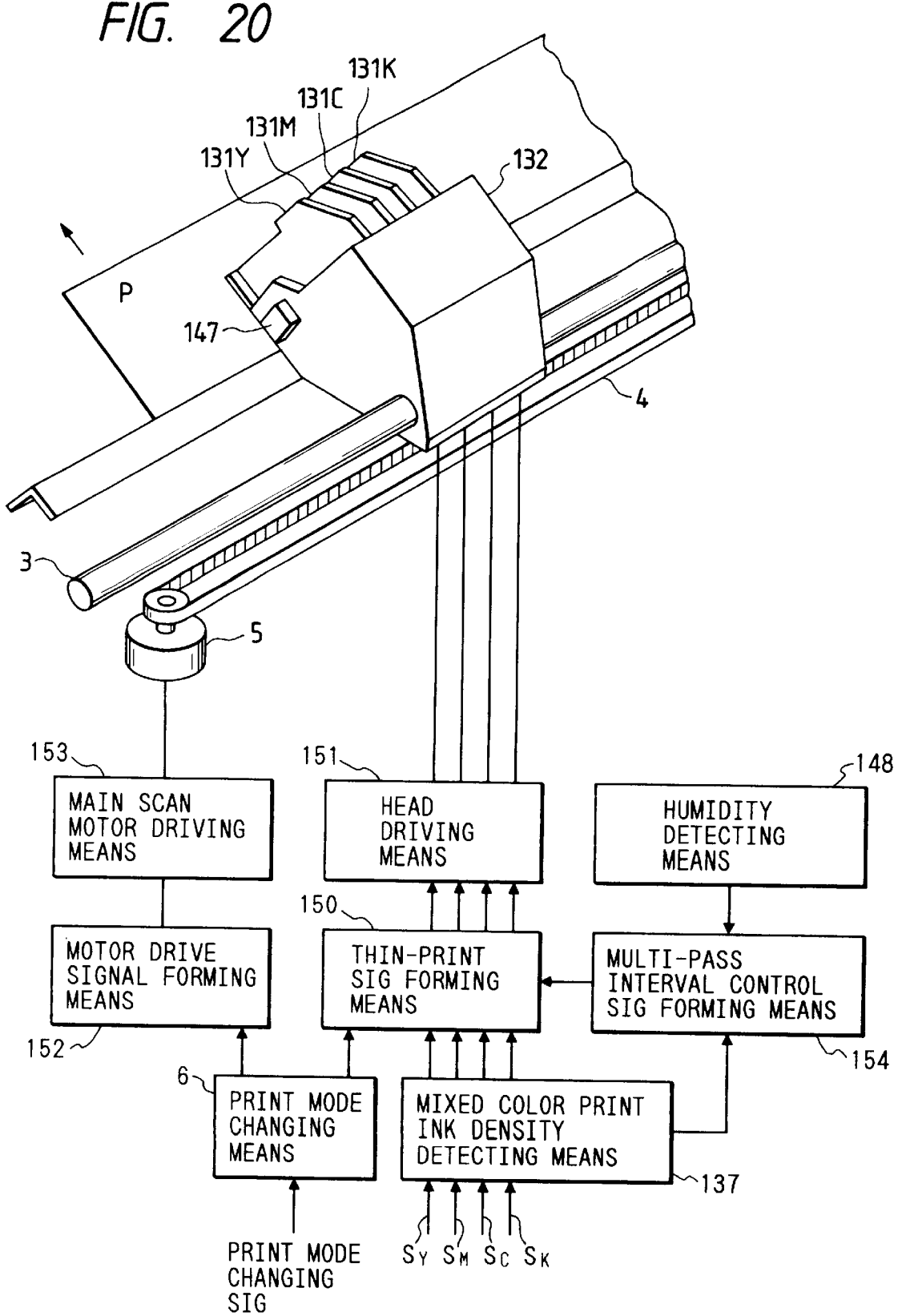

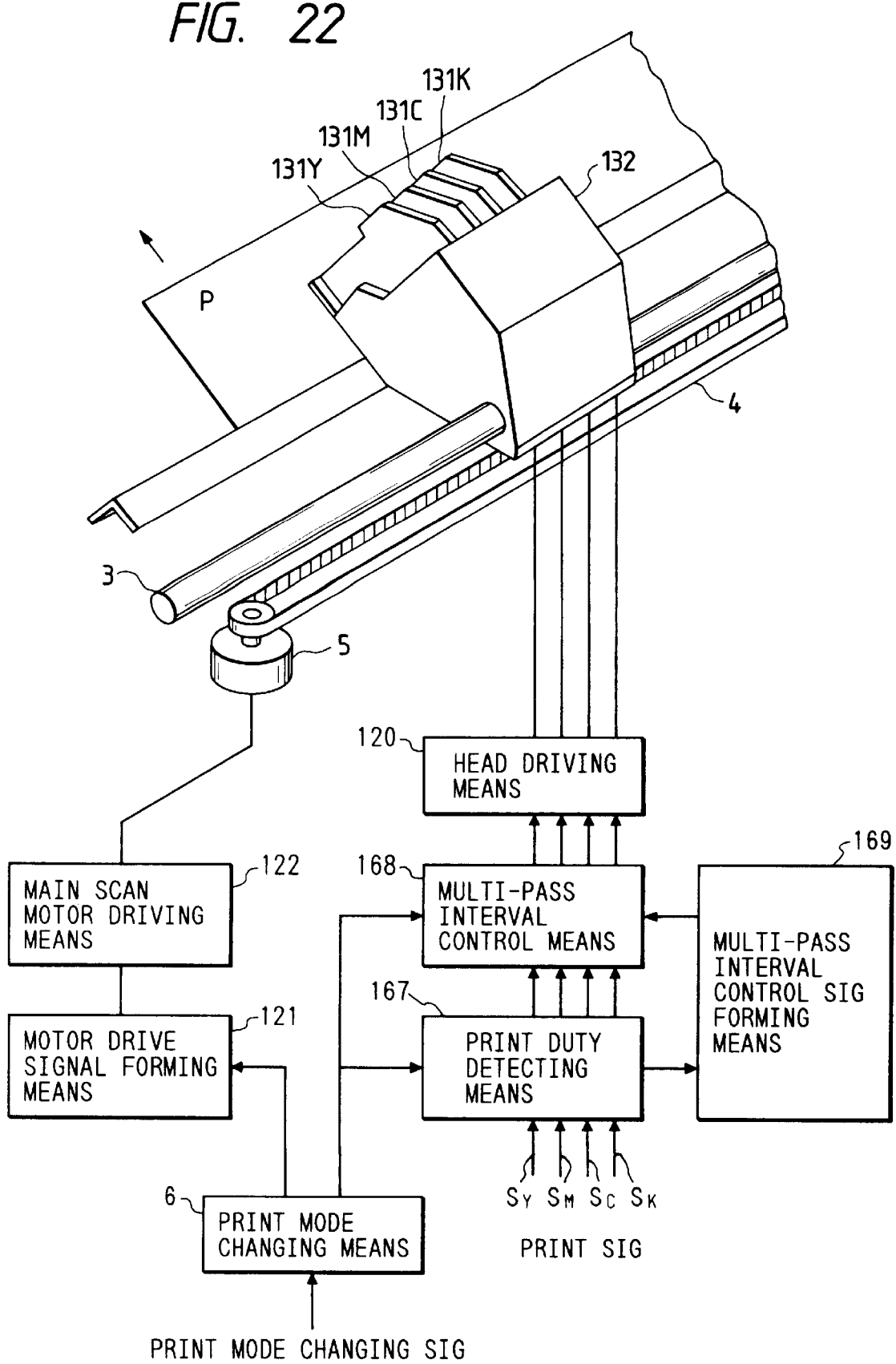

| MAX PRINT DUTY (%) | MULTI-PASS INTERVAL (SECOND) |
|---|---|
| UNDER 30% | 1 |
| 30% - UNDER 60% | 3.0 |
| 60% - UNDER 80% | 4.5 |
| 80% OR MORE | 6.0 |

FIG. 26A
PRIOR ART
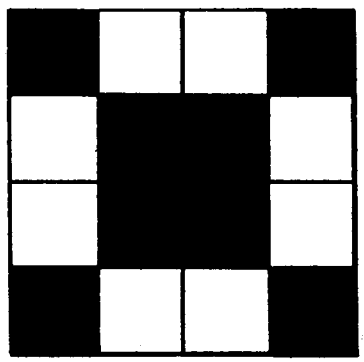
ORIGINAL PRINT SIGNAL
FIG. 26B
PRIOR ART
| 1 | 2 | 1 | 2 |
|---|---|---|---|
| 2 | 1 | 2 | 1 |
| 1 | 2 | 1 | 2 |
| 2 | 1 | 2 | 1 |
THINNING PATTERN
FIG. 26C
PRIOR ART
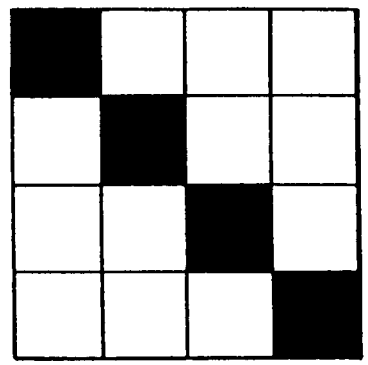
THIN-PRINT SIG $S_1$
FIG. 26D
PRIOR ART
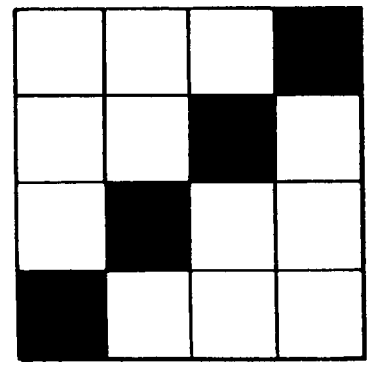
THIN-PRINT SIG $S_2$

INK JET RECORDING METHOD AND APPARATUS FOR RECORDING WITH MULTIPLE THINNED IMAGES

This application is a division of application Ser. No. 07/888,814 filed May 27, 1992, now abandoned.

BACKGROUND OF THE INVENTION

1. Field of the Invention

The present invention relates to an ink jet recording method and apparatus for performing recording by ejecting ink droplets onto a recording medium and, more particularly, to an ink jet recording method and apparatus for performing a multi-pass print operation.

2. Related Background Art

In recent years, office equipment such as computers, wordprocessors, and copying machines has widely become popular, and a large number of recording methods for recording apparatuses for this equipment have been developed. An ink jet recording apparatus has excellent features such as an easy high-definition recording operation, a high-speed operation, low noise, and an inexpensive structure.

The ink jet recording apparatus is prepared with various recording modes in addition to a simple one-scan recording mode for the purpose of solving the problem associated with fixing characteristics of an ink on a recording medium such as a paper sheet, an OHP film, or the like, and preventing density nonuniformity inherent to a recording head.

Of these recording modes, a multi-pass print mode for performing recording by scanning a single recording head a plurality of number of times on a single region on a recording medium is popularly used for various purposes.

For example, when a print operation is performed on a recording medium having no ink absorbency or a very low ink absorbency, or when a color recording operation is performed on a recording medium having a low ink absorbency using a plurality of recording heads having different ink colors, an ink overflows on the recording medium, and causes stripe-like nonuniformity (called "beading") or blurring at a boundary between different colors or densities (called "boundary blurring"), thus considerably deteriorating image quality. In order to prevent "beading" or "boundary blurring" caused by the overflowed ink, a so-called thin multi-pass print mode is employed. In this mode, a single scan pattern is thinned in -checkerboard patterns, and a plurality of thinning patterns are recorded a plurality of number of times, thereby finishing an image corresponding to all the recording data.

In this thin multi-pass print mode, it is considered that the following two effects reduce ink overflowing, and prevent "beading" or "boundary blurring".

(1) The ink amount printed in each pass is decreased as compared to that in a one-pass print mode, and ink is absorbed into a recording medium within a short period of time.

(2) The ink is dried during an interval between adjacent passes.

FIG. 25 is a schematic diagram of an ink jet recording apparatus for executing a conventional thin multi-pass print mode. In FIG. 25, a recording head 1 has a plurality of ink ejection orifices, and a plurality of electrothermal converting elements as ejection energy generating elements arranged in correspondence with the ejection orifices. An ejection signal according to recording data is supplied to each electrothermal converting element, and a bubble generated by heat causes a change in state in an ink, thereby ejecting an ink droplet from the corresponding ejection orifice. The apparatus shown in FIG. 25 includes a carriage 2 for holding the recording head, a guide shaft 3, arranged to oppose a recording medium P which is intermittently moved in a direction of an arrow in FIG. 25 (sub scan direction) by a sub scan roller (not shown), for supporting the carriage 2, a carriage belt 4 for reciprocally moving the carriage 2 along the guide shaft 3 (to perform a main scan operation), and a main scan motor 5 for driving the carriage belt. The apparatus also includes a print mode changing means 6 for changing a print mode automatically or in response to a manual switch operation of a user, a thin-print signal forming means 7 for, when the print mode changing means 6 selects the thin multi-pass print mode, forming thin-print signals for executing the thin multi-pass print mode from an input image signal (to be referred to as a print signal hereinafter) S, and a head driving means 8 for driving the recording head 1 according to a signal from the thin-print signal forming means 7. A main scan motor drive signal forming means 9 forms a signal for driving the main scan motor. When the print mode changing means 6 selects the thin multi-pass print mode, the means 9 sequentially generates driving signals corresponding in number to passes. A main scan motor driving means 10 controls the driving operation of the main scan motor 5 according to the signal from the motor drive signal forming means.

In this ink jet recording apparatus, the thin multi-pass print mode is executed as follows. When the print mode changing means 6 selects the thin multi-pass print mode automatically or in response to a manual switch operation by a user, an input image signal shown in FIG. 26A is thinned according to a predetermined thinning pattern (FIG. 26B) by the thin-print signal forming means 7 to be divided into thin-print signals S1 and S2, as shown in FIGS. 26C and 26D. Of these signals, the thin-print signal S1 is supplied to the head driving means 8 to drive the recording head 1, and ink droplets are ejected from the ejection orifices of the recording head 1. In synchronism with this head driving operation (in practice, a required minimum pass interval before the head driving operation), the main scan motor drive signal forming means 9 generates a main scan drive signal for the carriage, and the main scan motor 5 is driven according to a signal from the driving means. Thus, the carriage 2 is moved along the guide shaft 3 to perform the first-pass print operation. Upon completion of the print operation, the main scan motor 5 is driven in the reverse direction, and the carriage 2 is returned to the start position. The remaining thin-print signal S2 is then supplied to the head driving means 8 to drive the recording head 1, and the second-pass print operation is performed in the same manner as in the first pass. Thereafter, the apparatus prepares for the print operation of the next line.

During this interval, since the sub scan roller (not shown) is controlled not to move the recording medium P, the thin two-pass print operation can be realized. The thin two-pass print operation has been described. However, the same applies to multi-pass print modes using three or more passes.

Upon execution of the above-mentioned thin multi-pass print operation, in order to prevent an ink from overflowing on the recording medium, the number of times of multi-pass print operations is set to prevent "blurring" when a print operation is performed on the recording medium at the possibly highest ink density in an environment with the lowest ink drying speed among possible use environmental conditions. In addition, in order to prevent a decrease in throughput, the interval between the first and second passes (to be referred to as a multi-pass interval hereinafter) is set so that the print operation is started as soon as data are prepared.

For this reason, in order to output an image free from defects such as "beading", "boundary blurring", and the like, the number of times of passes is set to be very large, and this results in promotion of a mechanical wear of sliding portions, an increase in dust attachment frequency of the recording head, a complex electrical circuit for forming thinning data, and the like. Thus, an inexpensive ink jet recording apparatus which can output a high-quality image, and has high durability and reliability, cannot be constituted.

SUMMARY OF THE INVENTION

The present invention has been made in consideration of the above situation, and has as its object to provide an improved ink jet recording method and apparatus.

It is another object of the present invention to provide a low-cost ink jet recording method and apparatus, which can output a high-quality image, and achieves high durability and reliability.

It is still another object of the present invention to provide an ink jet recording method and apparatus, which can record a high-quality image without causing an unnecessary decrease in throughput.

It is still another object of the present invention to provide an ink jet recording method and apparatus, which records a plurality of thin images a plurality of number of times at an interval equal to or longer than a required minimum interval on a single region of a recording medium so as to obtain a desired image free from blurring.

It is still another object of the present invention to provide an ink jet recording method and apparatus, which records a plurality of thin images a plurality of number of times at a proper interval based on a predetermined condition on a single region of a recording medium so as to obtain a desired image free from blurring.

The above and other objects of the present invention will become apparent from the following description taken in conjunction with the accompanying drawings.

BRIEF DESCRIPTION OF THE DRAWINGS

FIG. 2 is a table showing the correspondence between the number of times of print passes and the required minimum pass interval in the first embodiment;

FIG. 4 is a table showing the correspondence between the number of times of print passes and the required minimum pass interval in the second embodiment;

FIG. 6 is a table showing the correspondence between the number of times of print passes and the required minimum pass interval in the third embodiment;

FIG. 7 is a schematic diagram of an ink jet recording apparatus according to the fourth embodiment of the present invention;

FIG. 9 is a table showing the correspondence between the maximum print duty and the multi-pass print interval;

FIG. 10 is a graph showing the relationship between the print duty and the pass interval necessary for preventing beading;

FIG. 11 is a table showing the correspondence between the maximum print duty and the multi-pass interval;

FIGS. 13A to 13E are views for explaining a method of obtaining a mixed color print duty;

FIG. 20 is a schematic diagram of an ink jet recording apparatus according to the seventh embodiment of the present invention;

FIG. 22 is a schematic diagram of an ink jet recording apparatus according to the seventh embodiment of the present invention;

FIGS. 26A to 26D are views for explaining thinning patterns.

DETAILED DESCRIPTION OF THE PREFERRED EMBODIMENTS

The preferred embodiments of the present invention will be described in detail hereinafter with reference to the accompanying drawings.

Note that the present invention is not limited to the embodiments to be described below, and includes various modifications within the range described in the scope of claims.

[First Embodiment]

Figure 1:
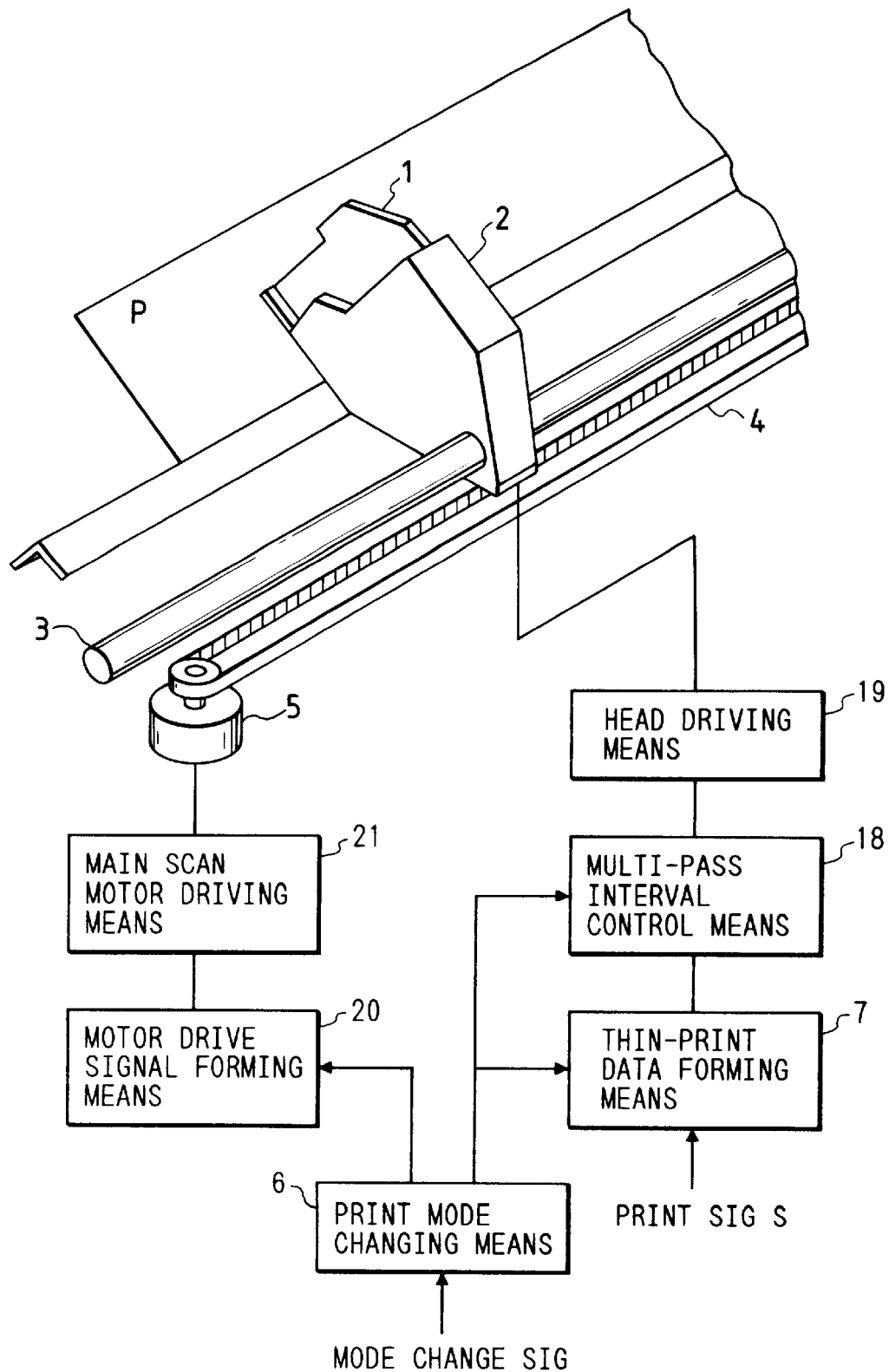
FIG. 1 is a schematic diagram of an ink jet recording apparatus according to the first embodiment of the present invention.
Figure 25:
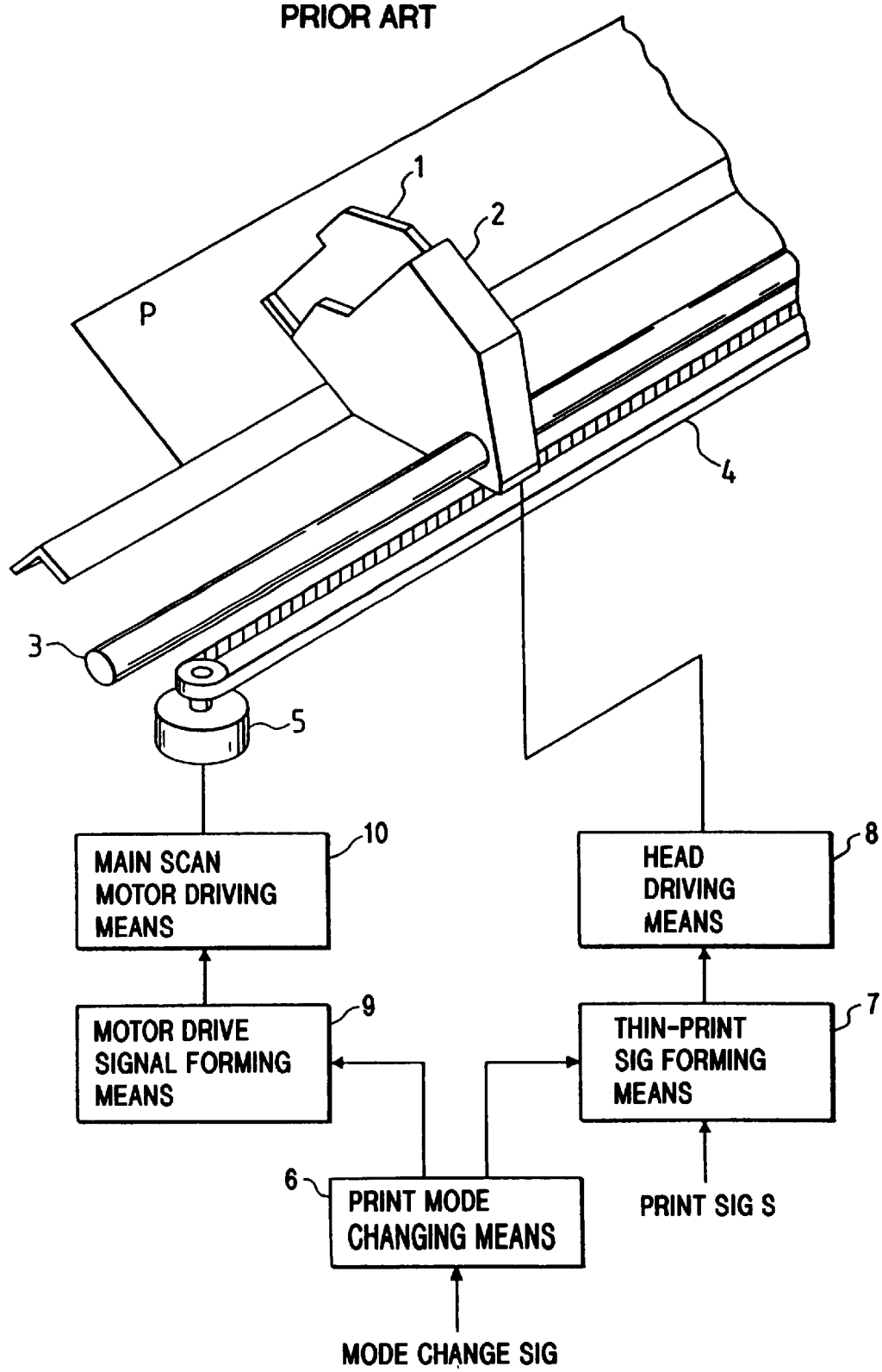
FIG. 25 is a schematic diagram of an ink jet recording apparatus for performing a conventional multi-pass print operation.

FIG. 1 is a schematic diagram of an ink jet recording apparatus adopting the present invention. In FIG. 1, constituting members 1 to 7 are the same as those in FIG. 25. This apparatus includes a multi-pass interval control means 18 used in a multi-pass print mode, a head driving means 19, a main scan motor drive signal forming means 20, and a main scan motor driving means 21.

A multi-pass print interval in the ink jet recording apparatus with this arrangement is controlled as follows.

When a print mode changing means 6 selects the thin multi-pass print mode automatically or in response to a manual switch operation by a user, an input image signal is input to a thin-print data forming means 7, and is divided into thin-print signals S1 and S2 by the same method described in FIGS. 26A to 26D. The thin-print signals S1 and S2 are sequentially supplied to the multi-pass interval control means 18. The multi-pass interval control means 18 supplies the thin-print signals S1 and S2 to the head driving means 19 at an interval longer than a required minimum pass interval, thereby driving a recording head 1. In synchronism with this operation, the main scan motor drive signal forming means 20 forms a main scan motor drive signal, and supplies it to the main scan motor driving means 21. As a result, a main scan motor 5 is driven to move a carriage 2, and a two-pass print operation of the first line is performed.

As a method of controlling the multi-pass interval in the multi-pass interval control means 18, the following method may be proposed. The multi-pass interval control means has at least memories M1 and M2 for holding thin-print data, a multi-pass interval measurement timer T, a comparator H for comparing a required minimum pass interval Ts With the value of the multi-pass interval measurement timer T, and an output means for outputting print data in the memories to the head driving means 19. After thin-print data S1 in the memory M1 is output to the head driving means 19, the multi-pass interval measurement timer T starts a time count operation, and at the same time, the comparator H begins to compare the value of the timer T and the required minimum pass interval Ts. When the comparator H determines that the value of the multi-pass interval measurement timer T exceeds the required minimum pass interval Ts, thin-print data S2 in the memory M2 is output to the head driving means 19. In this manner, an interval equal to or longer than the required minimum pass interval can always be formed between the first and second passes.

In our experiments, the bubble ink jet recording head of the printer BJ330 available from CANON INC. was used as a recording head, the black ink for the printer BJ330 was used as an ink, and a recording medium prepared by forming a 2-$\mu$ thick polyvinyl alcohol (PVA) coat on a polyethylene terephthalate (PET) film was used. The experiments were conducted in an environment at a temperature of 35° C. and a relative humidity of 90%. As a result, the relationship between the number of times of print passes and the required minimum pass interval, which-relation is necessary for preventing beading, is as shown in the table of FIG. 2. Thus, when the required minimum pass interval Ts was set to be 3 sec, and a thin two-pass print operation was performed, beading was prevented in the thin two-pass print operation, and a high-quality image could be printed. Thus, the number of times of print passes could be decreased.

Note that the required minimum pass interval Ts does not include a time t after the print operation of the first pass is started until the carriage 2 is returned to the home position, and the scan operation of the second pass is enabled. Therefore, an actual pass interval is a time longer than the time Ts obtained from FIG. 2 by the time t.

[Second Embodiment]

Another embodiment of the present invention will be described below.

Figure 3:
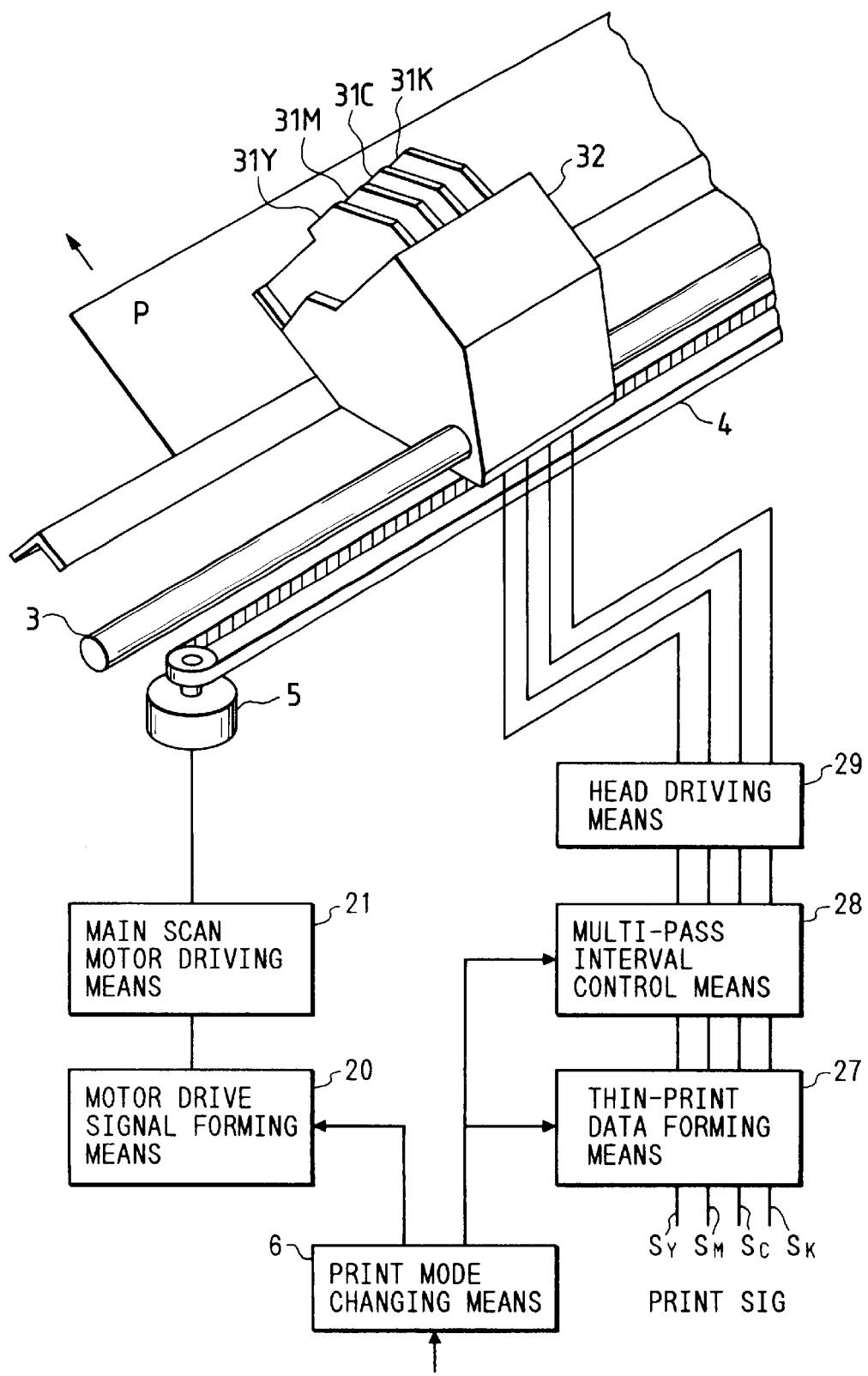
FIG. 3 is a schematic diagram of an ink jet recording apparatus according to the second embodiment of the present invention.

FIG. 3 shows an embodiment wherein the present invention is applied to an ink jet recording apparatus, which has a plurality of recording heads for ejecting inks of different colors, and performs color image recording. The apparatus shown in FIG. 3 includes recording heads 31K, 31C, 31M, and 31Y for respectively ejecting black, cyan, magenta, and yellow inks, a carriage 32 for holding these four recording heads, a thin-print data forming means 27 for forming thinning pattern signals (FIGS. 26A to 26D) of the respective colors from color print signals $S_Y$, $S_M$, $S_C$, and $S_K$, and a multi-pass interval control means 28 for control to set a pass interval in a multi-pass print mode to be an interval equal to or longer than the required minimum interval, as will be described later.

Multi-pass print interval control based on a print duty in the ink jet recording apparatus with the above arrangement is performed as follows.

When a print mode changing means 6 selects the thin multi-pass print mode automatically or in response to a manual switch operation by a user, print signals are supplied to the thin-print data forming means 27. The thin-print data forming means 27 divides the print signals into thin-print signals S1 (for four colors) and thin-print signals S2 (for four colors) by the same method as in FIGS. 26A to 26D, and supplies these thin-print signals to the multi-pass interval control means 28. The multi-pass interval control means 28 supplies the thin-print signals S1 and S2 at an interval longer than the required minimum pass interval like in the first embodiment, thereby driving the recording heads 31Y, 31M, 31C, and 31K. In synchronism with this operation, a main scan motor drive signal forming means 20 forms a main scan motor drive signal, and supplies it to a main scan motor driving means 21. As a result, a main scan motor 5 is driven to move the carriage 32, and a two-pass print operation of the first line is performed.

In our experiments, the bubble ink jet recording head (360 dpi, driven at 5 kHz) of the printer BJ330 available from CANON INC. was used as a recording head, the black ink for the printer BJ330 and color inks prepared by mixing cyan, magenta, and yellow dyes in a clear ink (an ink excluding a dye) were used as inks, and a PPC paper sheet was used as a recording medium. The experiments were conducted in an environment at a temperature of 35° C. and a relative humidity of 90%. The table of FIG. 4 shows the relationship between the number of times of print passes and the required minimum pass interval, which relationship is necessary for preventing "boundary blurring" at a boundary between different colors which occurs in a two-color mixing print operation at a duty of 100% in the conventional thin two-pass print mode. Thus, when the required minimum pass interval Ts was set to be 6 sec. and a thin two-pass print operation was performed, "boundary blurring" could be prevented in the thin two-pass print operation, and a high-quality image could be printed. As a result, the number of times of print passes could be greatly decreased. Furthermore, since a time necessary for forming thin-print data can be prolonged, thin-print data can be formed in a color sequential manner. Thus, electrical processing can be simplified, and a low-cost electrical circuit board can be provided as compared to a case wherein thin-print data are parallelly formed in units of colors.

In this embodiment, an actual pass interval is also longer than a time obtained from FIG. 4 by the above-mentioned time t.

[Third Embodiment]

Figure 5:
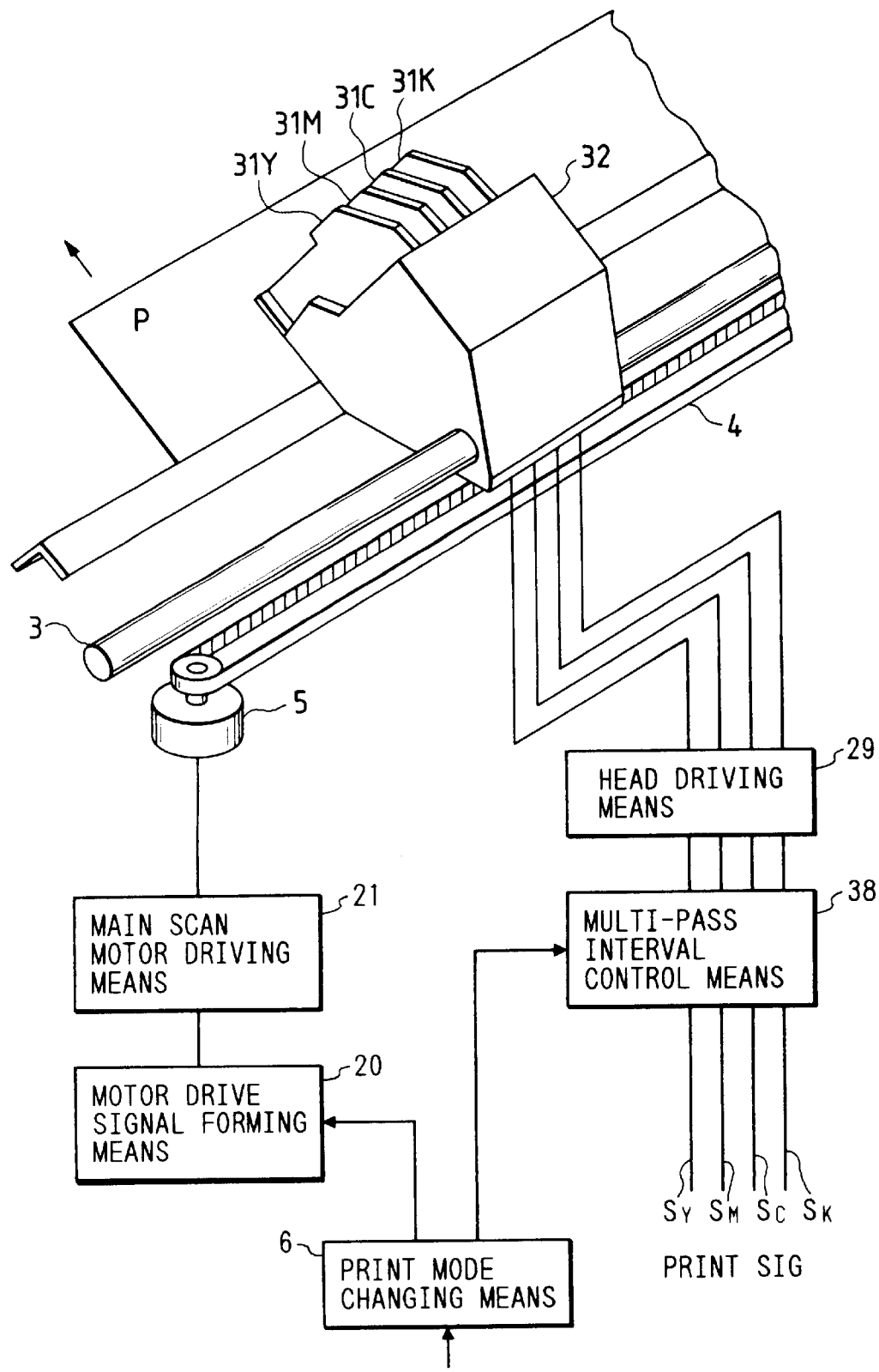
FIG. 5 is a schematic diagram of an ink jet recording apparatus according to the third embodiment of the present invention.

FIG. 5 shows an embodiment wherein the present invention is applied to a multi-pass print method for sequentially recording four colors. The same reference numerals in FIG. 5 denote the same parts as in FIG. 3. The apparatus of this embodiment further includes a multi-pass interval control means 38.

Multi-pass print interval control in the ink jet recording apparatus with the above arrangement is performed as follows. When a print mode changing means 6 selects the thin multi-pass print mode automatically or in response to a manual switch operation by a user, print signals $S_Y$, $S_M$, $S_C$, and $S_K$ supplied to the multi-pass interval control means 38 are sequentially transferred to a head driving means 29 color by color in each pass at an interval longer than the required minimum pass interval, thereby driving corresponding heads. In synchronism with this operation, a main scan motor drive signal forming means 20 forms a main scan motor drive signal, and supplies it to a main scan motor driving means 21. As a result, a main scan motor is driven to move a carriage 32, and a four-pass print operation of the first line is performed.

In our experiments, the bubble ink jet recording head (360 dpi, driven at 5 kHz) of the printer BJ330 available from CANON INC. was used as a recording head, the black ink for the printer BJ330 and color inks prepared by mixing cyan, magenta, and yellow dyes in a clear ink (an ink excluding a dye) were used as inks, and a PPC paper sheet was used as a recording medium. The experiments were conducted in an environment at a temperature of 35° C. and a relative humidity of 90%. The table of FIG. 6 shows the relationship between the number of times of print passes and the required minimum pass interval, which relationship is necessary for preventing "boundary blurring" at a boundary between different colors which occurs in a two-color mixing print operation at a duty of 100% in a conventional color-sequential four-pass print mode. Thus, when the required minimum pass interval Ts was set to be 6 sec. and a color-sequential four-pass print operation was performed, "boundary blurring" could be prevented in the thin two-pass print operation, and a high-quality image could be printed. As a result, the number of times of print passes could be greatly decreased. Furthermore, since thin-print data need not be formed, a circuit for forming thin-print data can be omitted, and cost can be greatly decreased.

In the third embodiment, the pass interval is fixed in the color-sequential multi-pass print mode. However, when different multi-pass intervals are set in correspondence with different colors, "boundary blurring" can be more effectively prevented. For example, when the color-sequential four-pass print operation is performed in the order of cyan, magenta, yellow, and black, the print intervals of yellow and black are set to be longer than those of the remaining colors, thereby effectively preventing "boundary blurring".

Furthermore, the multi-pass interval may also be controlled depending on a difference in types of recording media (a PPC paper sheet, an ink jet coat paper sheet, and the like), an environmental condition, and a difference in recording modes (a two-pass mode, a four-pass mode, and the like).

In this manner, when the print interval in the multi-pass print mode is controlled to be set to be always longer than the required minimum interval, an inexpensive apparatus, which can output a high-quality image, and has high durability and reliability, can be realized.

In the above embodiment, the multi-pass interval is constant. However, when a recording apparatus is used in an environment with a high drying speed of an ink, or when the print operation with a low ink density is to be performed, the multi-pass interval may be shortened to further improve the throughput. This embodiment will be described below.

[Fourth Embodiment]

FIG. 7 is a schematic diagram of an ink jet recording apparatus of this embodiment. In FIG. 7, constituting members 1 to 6 are the same as those shown in FIG. 25. The apparatus shown in FIG. 7 includes a print duty detecting means 117 for detecting a maximum print duty in one line of a print signal S, a multi-pass interval control signal forming means 118 for determining a multi-pass print interval according to a signal from the print duty detecting means 117, and forming a multi-pass interval control signal, a thin-print signal forming means 119, a head driving means 120, a main scan motor drive signal forming means 121, and a main scan motor driving means 122.

Multi-pass print interval control based on a print duty in the ink jet recording apparatus with the above arrangement is performed as follows.

When a print mode changing means 6 selects the thin multi-pass print mode automatically or in response to a manual switch operation by a user, an input image signal is supplied to the print duty detecting means 117 to detect the maximum value of print duties in one line. The detected maximum value is supplied as a signal to the multi-pass interval control signal forming means 118.

A method of detecting the maximum value of print duties in this embodiment is as follows.

Figures 8A, 8B:
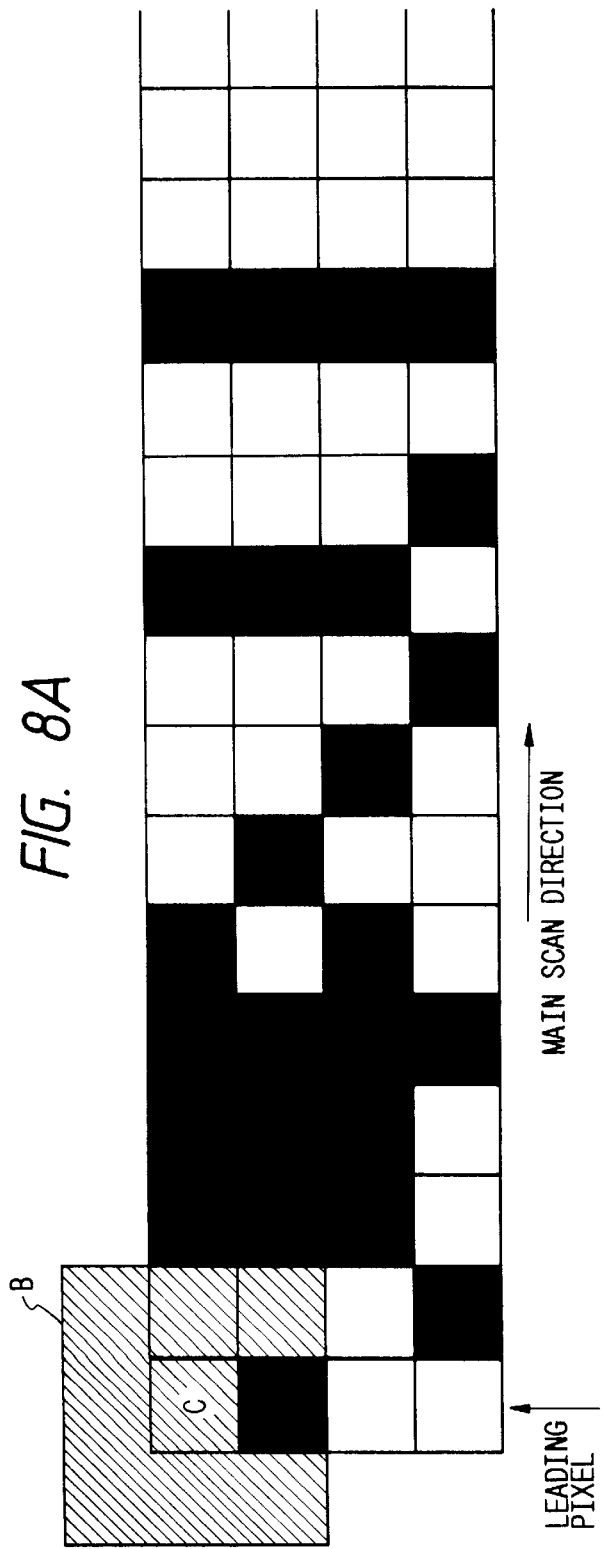
FIGS. 8A and 8B are views for explaining a method of obtaining a print duty.

As shown in FIG. 8A, a pixel range B (indicated by hatching in FIG. 8A) including the specific number N of pixels (in this embodiment, N=9) is assumed, and the number n of print pixels (n=1 in the range B in FIG. 8A) in the range is checked to calculate n/N. Thus, n/N is determined as a print duty D at a central pixel C. The print duty determined in this manner is obtained for all the pixels in a print-region, and the maximum value of the obtained print duties is determined as a maximum value of print duties in one line. FIG. 8B shows print duties of pixels in a print pattern shown in FIG. 8A, which are obtained by the above-mentioned method. In this case, the maximum value of the print duties is that of a pixel surrounded by a bold line in FIG. 8B, i.e., D=9/9 (=100%).

The multi-pass interval control signal forming means 118 determines a multi-pass interval according to a signal indicating the maximum print duty input from the print duty detecting means 117, and forms a multi-pass interval control signal. This signal is sent to the thin-print signal forming means 119. The multi-pass interval is determined on the basis of, e.g., a table in FIG. 9 showing the correspondence between the maximum print duty and the multi-pass print interval (an arbitrary unit in FIG. 9). The multi-pass interval control signal for controlling a transfer interval of thin-print data is formed so that the print operations can be performed at the determined multi-pass interval, and is supplied to the thin-print signal forming means 119. The thin-print signal forming means 119 divides an input print signal into thin-print signals S1 and S2 by the same method as in FIGS. 26A to 26D, and sequentially supplies the thin-print signals to the head driving means 120 at a corresponding time interval according to the multi-pass interval control signal, thereby driving a recording head 1. In synchronism with this operation, the main scan motor drive signal forming means 121 forms a main scan motor drive signal, and supplies it to the main scan motor driving means 122. As a result, a main scan motor 5 is driven to move a carriage 2, and a two-pass print operation of the first line is performed.

In our experiments, the bubble ink jet recording head (360 dpi, driven at 5 kHz) of the printer BJ330 available from CANON INC. was used as a recording head, the black ink for the printer BJ330 was used as an ink, and a recording medium prepared by forming a 2-$\mu$ thick polyvinyl-alcohol (PVA) coat on a polyethylene terephthalate (PET) film was used. The experiments were conducted in an environment at a temperature of 35° C. and a relative humidity of 90%. When an image was printed in the conventional thin two-pass print mode, the above-mentioned "beading" could not be prevented unless the interval between the first and second passes was set to be 3 sec or more. When the conventional thin-print pass method is used, if the pass interval in the two-pass print mode is set to be 3 sec. the print time is prolonged by about 200 sec per A4-size recording medium as compared to a one-pass print mode independently of the print duty.

However, according to our experiments, a pass interval necessary for preventing "beading" in the two-pass print mode tends to be shortened as the print duty becomes lower, as shown in the graph of FIG. 10. Thus, a table showing the correspondence between the maximum print duty and the pass interval was created, as shown in FIG. 11, and the multi-pass interval control described in the above embodiment was performed. At this time, as a print image, when an image at a duty of 100% was printed on the upper half of an A4-size recording medium, and an image at a duty of 30% was printed on the lower half of the recording medium, the print time could be shortened by about 100 sec as compared to the conventional thin multi-pass print method, and an image free from image quality deterioration such as "beading" could be obtained, thus providing remarkable effects.

Note that the required minimum pass interval in FIG. 10 does not include a time t after the print operation of the first pass is started until the carriage 2 is returned to the home position, and the scan operation of the second pass is enabled. Therefore, an actual pass interval is a time longer than the time obtained from FIG. 11 by the time t.

[Fifth Embodiment]

Still another embodiment of the present invention will be described below.

Figure 12:
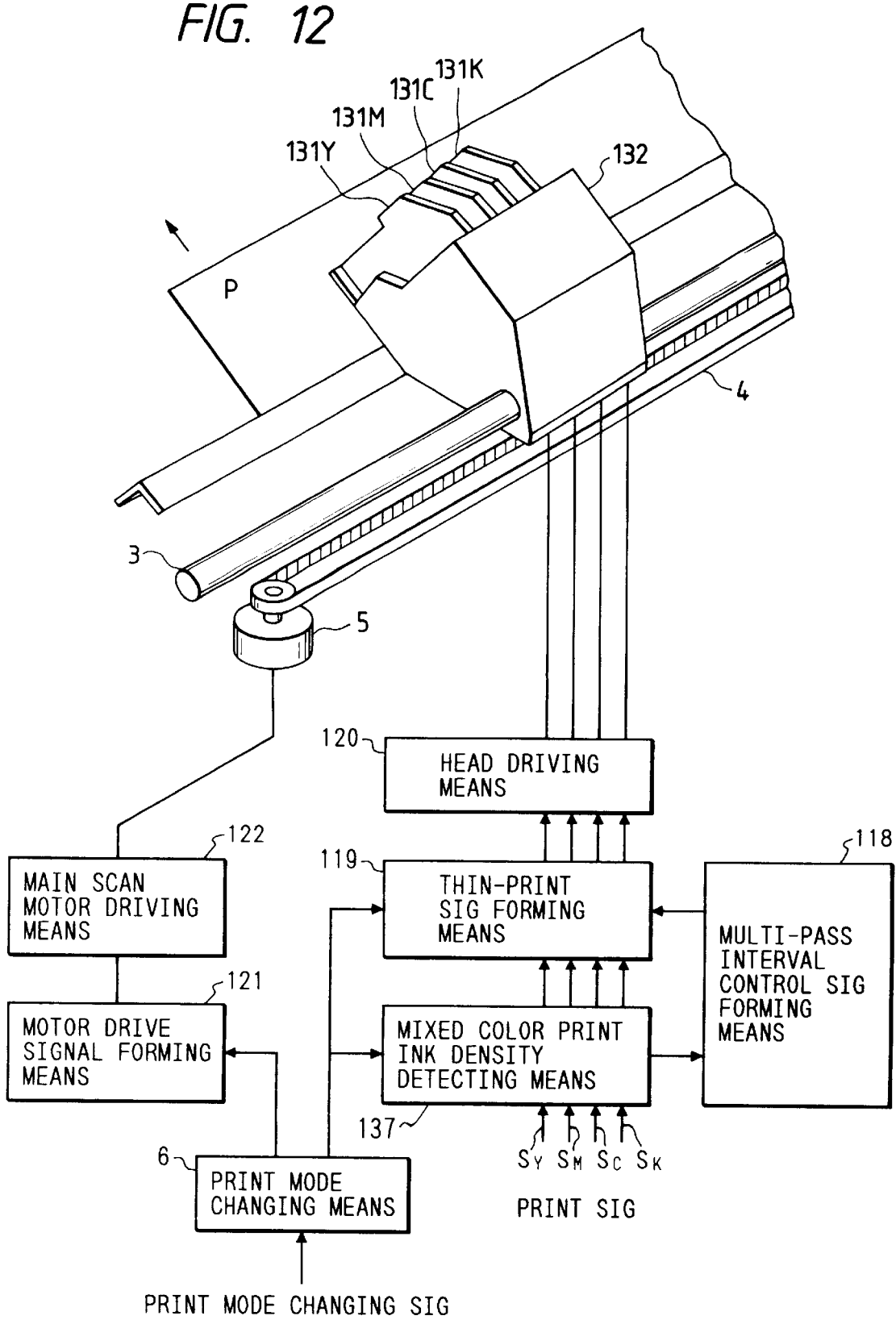
FIG. 12 is a schematic diagram of an ink jet recording apparatus according to the fifth embodiment of the present invention.

FIG. 12 shows an embodiment wherein the present invention is applied to an ink jet recording apparatus which has a plurality of recording heads for ejecting different color inks to perform color image recording.

The apparatus shown in FIG. 12 includes recording heads 131K, 131C, 131M, and 131Y for respectively ejecting black, cyan, magenta, and yellow inks, a carriage 132 for holding these four recording heads, and a mixed color print ink density detecting means 137. Note that constituting members 3 to 6 and 118 to 122 are the same as those in FIG. 7.

Multi-pass print interval control based on a print duty in the ink jet recording apparatus with the above arrangement is performed as follows.

When a print mode changing means 6 selects the thin multi-pass print mode automatically or in response to a manual switch operation by a user, an input image signal is supplied to the mixed color print ink density detecting means 137 to predict a maximum value of print ink densities in one line. The predicted maximum value is supplied as a signal to a multi-pass interval control signal forming means 118.

A method of predicting the maximum value of print ink densities of a mixed color portion of a color image in this embodiment is as follows.

The print duty per pixel of each color is obtained by the method described in the fourth embodiment with reference to FIGS. 8A and 8B. The print duties per pixel at the same pixel position of the respective colors are added to obtained a mixed color print duty at that pixel position. This mixed color print duty is determined as a mixed color print ink density of each pixel, and the maximum value of the mixed color print ink densities is then obtained. FIGS. 13A to 13E show an example. In FIGS. 13A to 13E, as for a pixel of interest (a pixel surrounded by a bold line), the K print duty is 6/9, the C print duty is 4/9, the M print duty is 0/9, and the Y print duty is 5/9. Thus, the mixed color print duty to be obtained (i.e., the print ink density) is 6/9+4/9+0/9+5/9= 15/9.

The multi-pass interval control signal forming means 118 determines a multi-pass interval according to a signal indicating the maximum print duty input from the mixed color print ink density detection means 137, and forms a multi-pass interval control signal. This signal is supplied to a thin-print signal forming means 119. The thin-print signal forming means 119 divides print signals into thin-print signals S1 (for four colors) and thin-print signals S2 (for four colors) by the same method as in FIGS. 26A to 26D, and sequentially supplies these thin-print signals to a head driving means 120 at a corresponding time interval according to the multi-pass interval control signal, thereby driving the recording heads 131K, 131C, 131M, and 131Y. In synchronism with this operation, a main scan motor drive signal forming means 121 forms a main scan motor drive signal, and supplies it to a main scan motor driving means 122. As a result, a main scan motor 5 is driven to move the carriage 132, and a two-pass print operation of the first line is performed.

In our experiments, the bubble ink jet recording head (360 dpi, driven at 5 kHz) of the printer BJ330 available from CANON INC. was used as a recording head, the black ink for the printer BJ330 and color inks prepared by mixing cyan, magenta, and yellow dyes in a clear ink (an ink excluding a dye) were used as inks, and a PPC paper sheet was used as a recording medium. The experiments were conducted in an environment at a temperature of 35° C. and a relative humidity of 90%. In a two-color mixing print operation at a duty of 100% in the conventional thin two-pass print mode, "boundary blurring" at a boundary between different colors occurred, and image quality was considerably deteriorated. Thus, a satisfactory image could not be obtained unless the interval between the first and second passes was set to be 6 sec or more. When the conventional thin-print pass method is used, if the pass interval in the two-pass print mode is set to be 6 sec, the print time is prolonged by about 400 sec per A4-size recording medium as compared to a one-pass print mode independently of the print ink density.

Figures 14, 15:
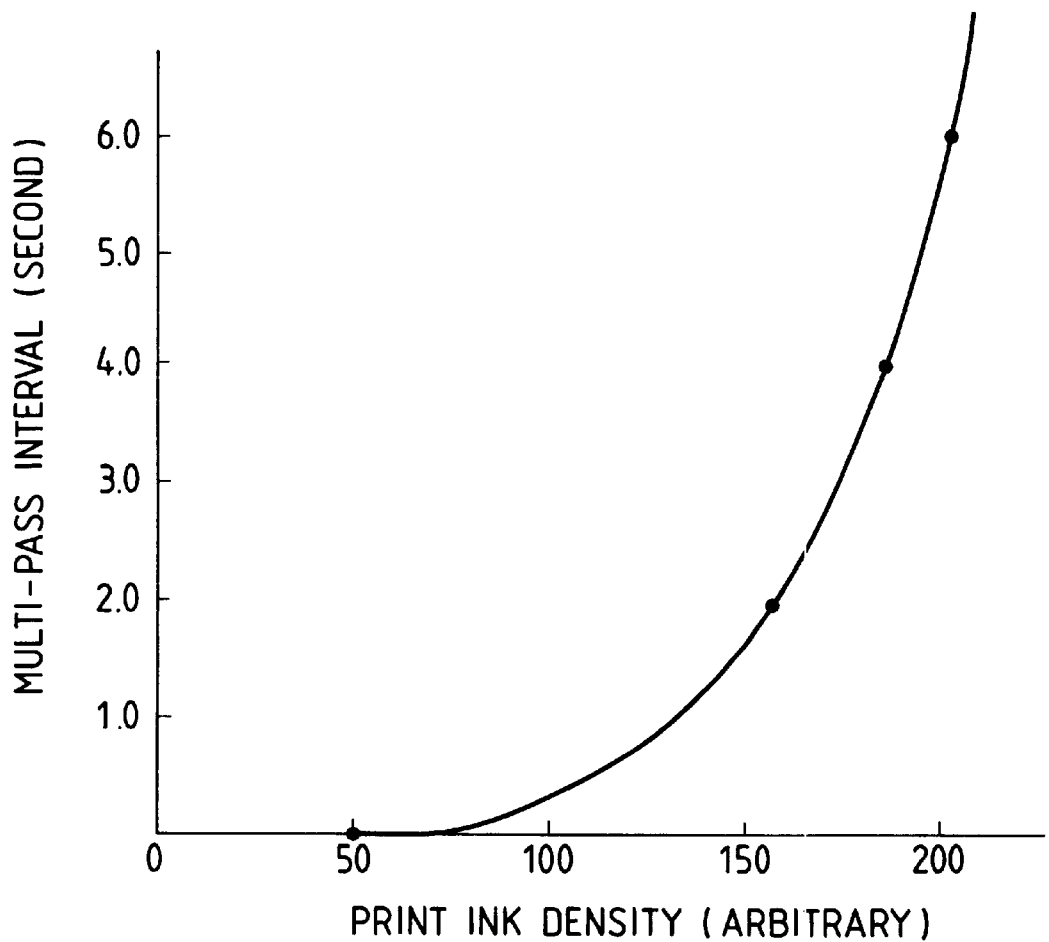
FIG. 14 is a graph showing the relationship between the print ink density and the required pass interval.
FIG. 15 is a table showing the correspondence between the maximum print ink density and the pass interval.

However, according to our experiments, a pass interval necessary for preventing "boundary blurring" in the two-pass print operation tends to be abruptly shortened as the maximum print ink density becomes lower, as shown in the graph of FIG. 14. Thus, the multi-pass interval control described in the above embodiment was performed according to a table showing the correspondence between the maximum ink density and the pass interval, as shown in FIG. 15. At this time, as a print image, when a block pattern in which different two-color mixed blocks at a duty of 100% were aligned was printed on the upper half of an A4-size recording medium, and a two-color mixed image at a print duty of 30% was printed on the lower half of the recording medium, the print time could be shortened by about 200 sec as compared to the conventional thin multi-pass print method, and an image free from image quality deterioration such as "boundary blurring" could be obtained, thus providing remarkable effects.

In this embodiment, an actual pass interval is also longer by the time t than the time obtained from FIG. 15.

[Sixth Embodiment]

Figure 16:
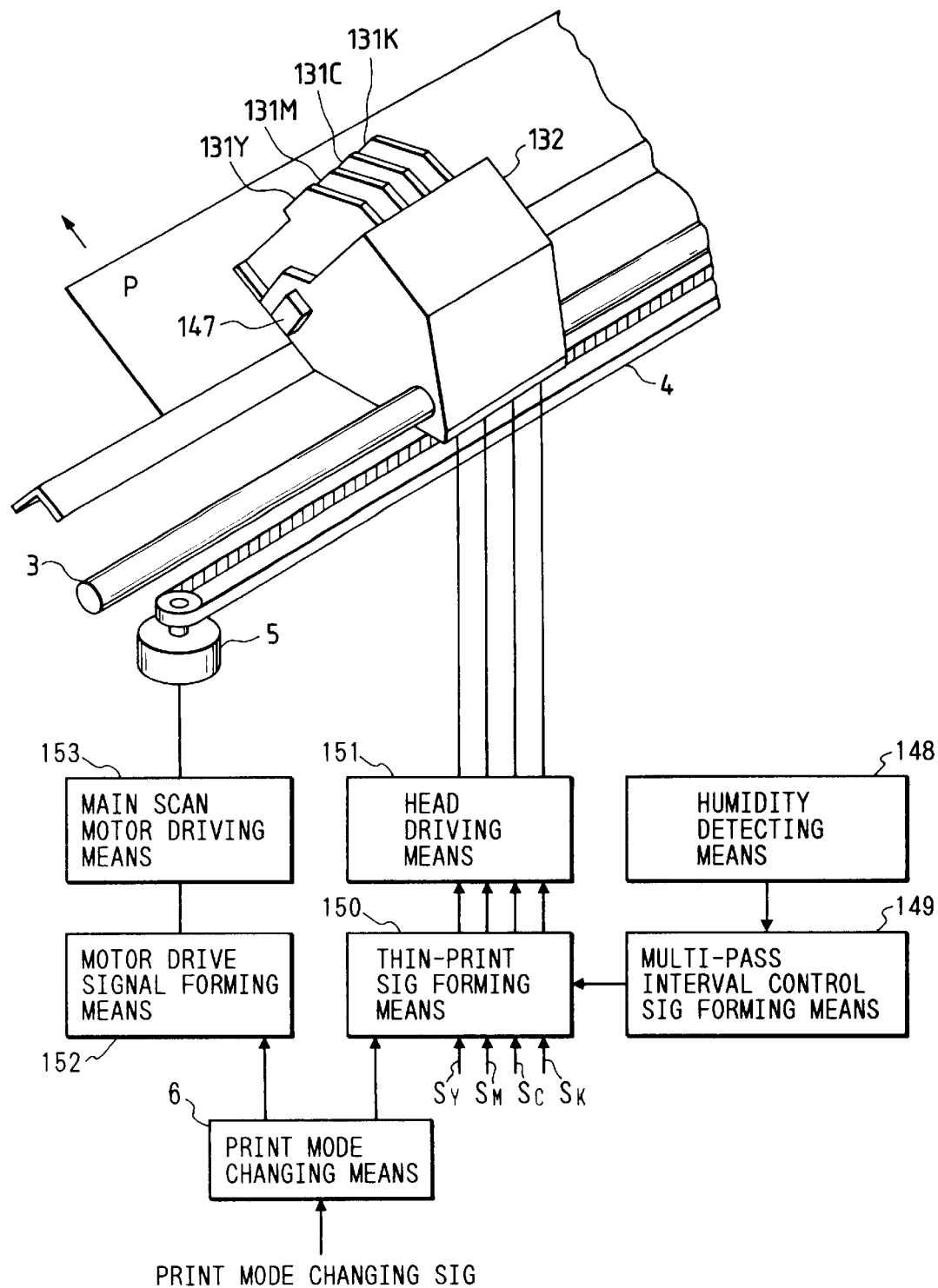
FIG. 16 is a schematic diagram of an ink jet recording apparatus according to the sixth embodiment of the present invention.

FIG. 16 shows the sixth embodiment of the present invention. The same reference numerals in FIG. 16 denote the same constituting members as in FIG. 12. The apparatus shown in FIG. 16 includes a relative humidity detector (e.g., a semiconductor humidity sensor) 147 arranged on a carriage 132, a relative humidity detecting means 148 for detecting a relative humidity near a recording unit upon reception of a signal from the relative humidity detector 147, a multi-pass interval control signal forming means 149 for determining a multi-pass print interval according to a signal from the relative humidity detecting means 148, and forming a multi-pass interval control signal, a thin-print signal forming means 150, a head driving means 151, a main scan motor drive signal forming means 152, and a main scan motor driving means 153.

Multi-pass print interval control based on a print duty in the ink jet recording apparatus with the above arrangement is performed as follows.

Figures 17, 18:
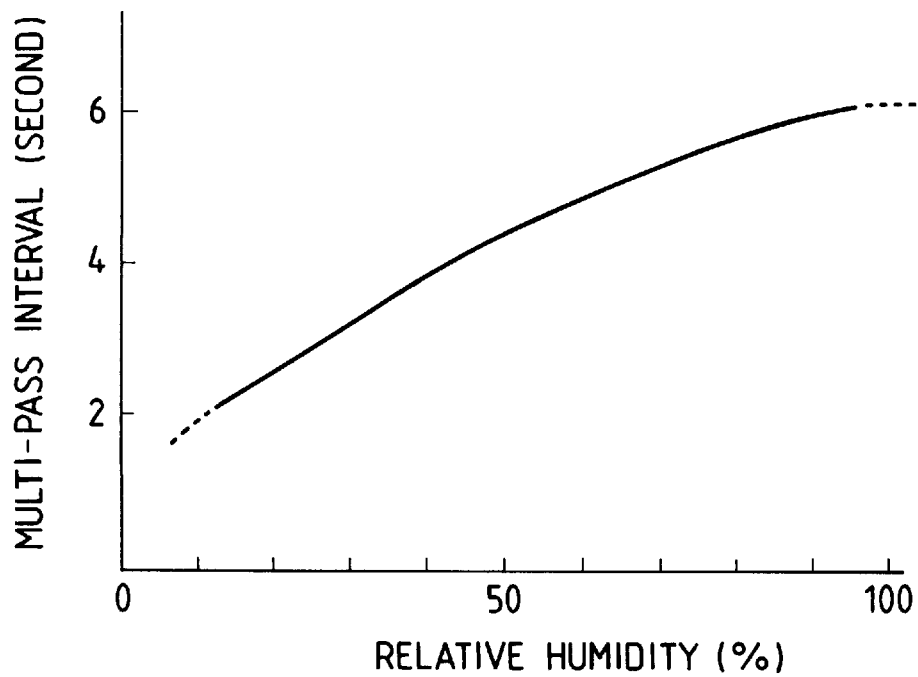
FIG. 17 is a table showing the correspondence between the relative humidity and the multi-pass interval.
FIG. 18 is a graph showing the relationship between the relative humidity and the required pass interval.

When a print mode changing means selects the thin multi-pass print mode automatically or in response to a manual switch operation by a user, the relative humidity detecting means 148 drives the relative humidity detector 147 to detect a relative humidity near the relative humidity detector 147, and supplies it as a signal to the multi-pass interval control signal forming means 149. The multi-pass interval control signal forming means 149 determines a multi-pass interval according to the input relative humidity signal, and forms a multi-pass interval control signal. The multi-pass interval control signal is supplied to the thin-print signal forming means 150. The multi-pass interval is determined on the basis of, e.g., a table in FIG. 17 showing the correspondence between the relative humidity and the multi-pass print interval (an arbitrary unit in FIG. 17). The multi-pass interval control signal for controlling the transfer interval of thin-print data is formed, so that the print operations can be performed at the determined multi-pass interval, and is supplied to the thin-print signal forming means 150.

The thin-print signal forming means 150 divides print signals into thin-print signals S1 (for four colors) and thin-print signals S2 (for four colors) by the same method as in FIGS. 26A to 26D, and sequentially supplies these thin-print signals to the head driving means 151 at a corresponding time interval according to the multi-pass interval control signal, thereby driving heads. In synchronism with this operation, the main scan motor drive signal forming means 152 forms a main scan motor drive signal, and supplies it to the main scan motor driving means 153. As a result, a main scan motor 5 is driven to move the carriage 132, and a two-pass print operation of the first line is performed.

In our experiments, the bubble ink jet recording head (360 dpi, driven at 5 kHz) of the printer BJ330 available from CANON INC. was used as a recording head, the black ink for the printer BJ330 and color inks prepared by mixing cyan, magenta, and yellow dyes in a clear ink (an ink excluding a dye) were used as inks, and a PPC paper sheet was used as a recording medium. The experiments were conducted in an environment at a temperature of 35° C. and a relative humidity of 90%. In a two-color mixing print operation at a duty of 100% in the conventional thin two-pass print mode, "boundary blurring" at a boundary between different colors occurred, and image quality was considerably deteriorated. Thus, a satisfactory image could not be obtained unless the interval between the first and second passes was set to be 6 sec or more.

Figures 19, 21:
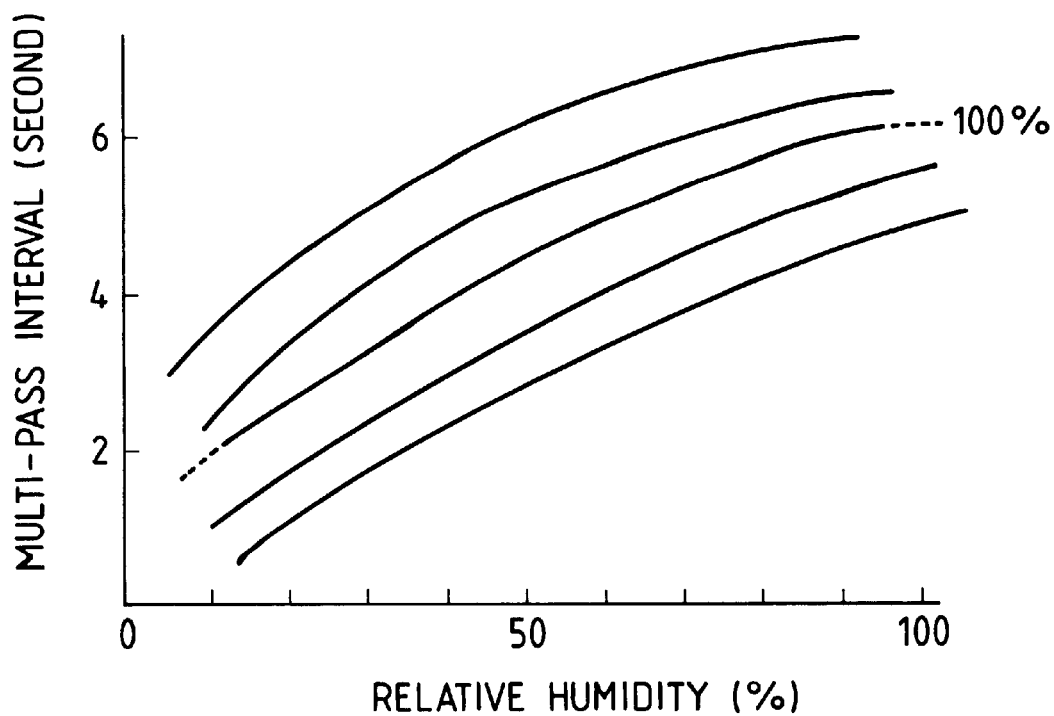
FIG. 19 is a table showing the correspondence between the relative humidity and the multi-pass interval.
FIG. 21 is a graph showing the relationship between the relative humidity and the pass interval when the print ink density is used as a parameter.

When the conventional thin-print pass method is used, if the pass interval in the two-pass print mode is set to be 6 sec, the print time is prolonged by about 400 sec per A4-size recording medium as compared to a one-pass print mode independently of the print ink density. However, according to our experiments, a pass interval necessary for preventing "boundary blurring" in the two-pass print operation tends to be shortened as the relative humidity near the print unit becomes lower in an environment at 35° C., as shown in the graph of FIG. 18. Thus, a table showing the correspondence between the relative humidity and the pass interval was created, as shown in FIG. 19, and the multi-pass interval control described in the above embodiment was performed. At this time, as a print image, when a block pattern in which different two-color mixed blocks at a duty of 100% were aligned was printed on the entire surface of an A4-size recording medium in an environment at a relative humidity of 50%, the print time could be shortened by about 200 sec as compared to the conventional thin multi-pass print method, and an image free from image quality deterioration such as "boundary blurring" could be obtained, thus providing remarkable effects.

In this embodiment, an actual pass interval is also longer by the time t than the time obtained from the table shown in FIG. 19.

[Seventh Embodiment]

FIG. 20 shows the seventh embodiment of the present invention. The same reference numerals in FIG. 20 denote the same constituting members as those in FIGS. 12 and 16. In FIG. 20, a multi-pass interval control signal forming means 154 determines a multi-pass print interval on the basis of signals from a humidity detecting means 148 and a mixed color print ink density detecting means 137, and forms a multi-pass interval control signal. The multi-pass interval control signal is supplied to a thin-print signal forming means 150, and a multi-pass print operation is performed in the same manner as in the sixth embodiment.

The relationship between the relative humidity and the multi-pass interval when the print ink density is used as a parameter has characteristics, as shown in FIG. 21. More specifically, as the print ink density becomes higher, the multi-pass interval must be prolonged. Also, as the humidity becomes higher while the print ink density is kept constant, the multi-pass interval must be prolonged. Thus, a table showing the correspondence among the maximum ink density, the relative humidity, and the pass interval can be created on the basis of the characteristics like in the above embodiment so as to control the multi-pass interval.

[Eighth Embodiment]

FIG. 22 shows an embodiment wherein the present invention is applied to a multi-pass print method for performing recording in a four-color sequential manner. The same reference numerals in FIG. 22 denote the same constituting members as those in FIG. 12. The apparatus shown in FIG. 22 includes a print duty detecting means 167, a multi-pass interval control means 168, and a multi-pass interval control signal forming means 169.

Multi-pass print interval control in the ink jet recording apparatus with this arrangement is performed as follows.

When a print mode changing means 6 selects the thin multi-pass print mode automatically or in response to a manual switch operation by a user, an input image signal is supplied to the print duty detecting means 167, and the maximum print duty in one line of each color is detected by the same method as in the fourth embodiment. The detected maximum print duty is supplied as a signal to the multi-pass interval control signal forming means 169. The multi-pass interval control signal forming means 169 determines a multi-pass interval according to the input maximum print duties of the respective colors, and forms a multi-pass interval control signal. The multi-pass interval control signal is supplied to the multi-pass interval control means 168.

As a means for determining the multi-pass interval on the basis of the maximum print duties of the respective colors, a table showing the correspondence between the maximum print duty and the multi-pass interval is created on the basis of the maximum print duty of a color to be printed like in the above embodiment, and the multi-pass interval is determined on the basis of this table.

Print signals $S_Y$, $S_M$, $S_C$, and $S_K$ supplied to the multi-pass interval control means 168 are sequentially transferred to a head driving means 120 color by color in each pass at the multi-pass interval determined by the multi-pass interval control signal, thereby driving recording heads 131Y, 131M, 131C, and 131K. In synchronism with this operation, a main scan motor drive signal forming means 121 forms a main scan motor drive signal, and supplies it to a main scan motor driving means 122. Thus, a main scan motor 5 is driven to move a carriage 132, and a four-pass print operation of the first line is performed.

Figures 23, 24:
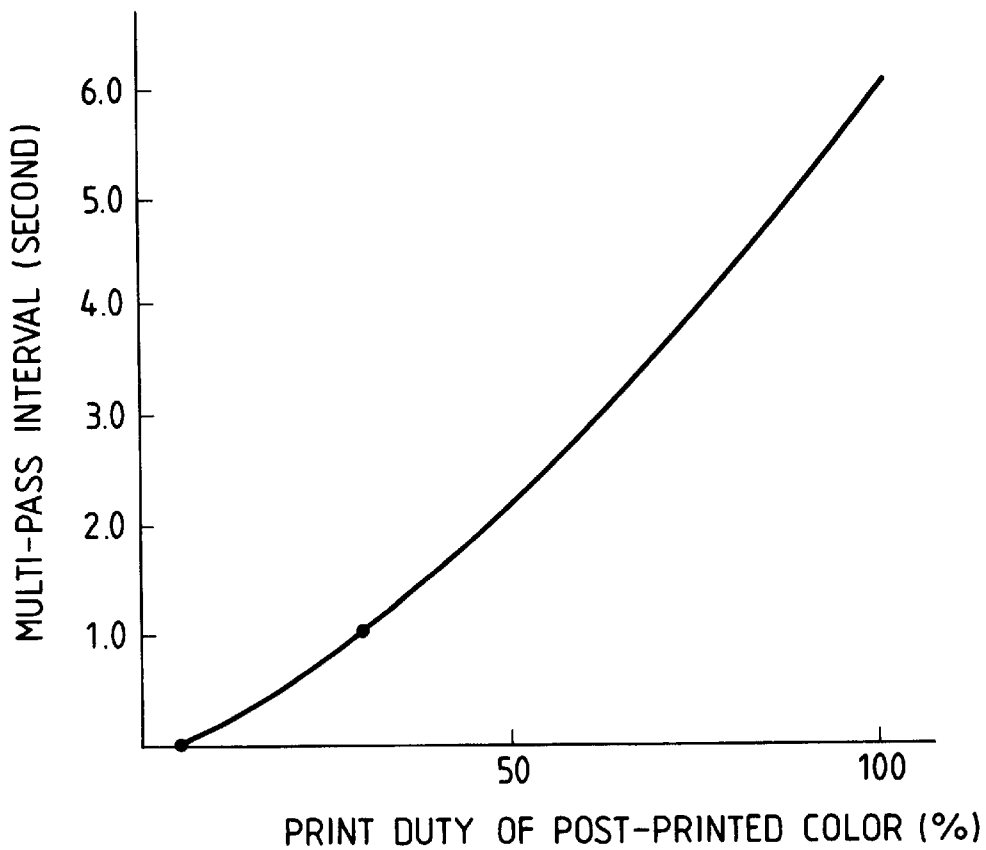
FIG. 23 is a graph showing the relationship between the print duty of a post-printed color and the multi-pass interval.
FIG. 24 is a table showing the correspondence between the maximum print duty and the multi-pass interval.

In our experiments, the bubble ink jet recording head (360 dpi, driven at 5 kHz) of the printer BJ330 available from CANON INC. was used as a recording head, the black ink for the printer BJ330 and color inks prepared by mixing cyan, magenta, and yellow dyes in a clear ink (an ink excluding a dye) were used as inks, and a PPC paper sheet was used as a recording medium. A color-sequential four-pass print operation was performed in the order of cyan, magenta, yellow, and black in an environment at a temperature of 35° C. and a relative humidity of 90%. In a two-color mixing print operation at a duty of 100%, "boundary blurring" occurred at a boundary between different colors, and image quality was considerably deteriorated. Thus, a satisfactory image could not be obtained unless the interval between adjacent passes was set to be 6 sec or more. When the conventional thin-print pass method is used, if the pass interval in the two-pass print mode is set to be 6 sec. the print time is prolonged by about 1,200 sec per A4-size recording medium as compared to a one-pass print mode independently of the print duty. However, according to our experiments, a pass interval necessary for preventing "boundary blurring" upon execution of the color-sequential multi-pass print operation tends to be shortened as the maximum print duty of a post-printed color becomes lower when an image at a duty of 100% is previously printed. Thus, a table showing the correspondence between the maximum print duty and the multi-pass interval was created, as shown in FIG. 24, and the multi-pass interval control described above was performed. At this time, as a print image, when a block pattern in which different two-color mixed blocks at a duty of 100% were aligned was printed on the upper half of an A4-size recording medium, and a two-color mixed image at a print duty of 30% was printed on the lower half of the recording medium, the print time could be shortened by about 800 sec as compared to the conventional thin multi-pass print method, and an image free from image quality deterioration such as "boundary blurring" could be obtained, thus providing remarkable effects. Furthermore, the ink density of the mixed color portion need not be detected, and thin-print data need not be formed. Therefore, electrical circuits for these operations can be omitted, and cost can be greatly reduced.

[Other Embodiments]

In the above embodiments, upon execution of color image recording, it is more effective if different multi-pass control operations are performed depending on a difference in unit colors or mixed colors. For example, when "boundary blurring" is conspicuous like at a boundary between yellow and black, the pass interval between these colors may be set to be longer than those for the remaining colors, or the print duties of the respective colors to be added when the print ink density is obtained may be multiplied with different weighting coefficients.

For example, in the eighth embodiment, in the color-sequential multi-pass print operation, the pass interval is fixed independently of colors. When different multi-pass intervals are set depending on a color difference, "boundary blurring" can be more effectively prevented. In our experiments, when the color-sequential four-pass print operation was performed in the order of cyan, magenta, yellow, and black, the print interval between yellow and black was set to be longer than that for the remaining colors so as to effectively prevent "boundary blurring".

In the above embodiments, as an example of the thin multi-pass print method, the method of thinning print data of each unit color into checkerboard or inverted checkerboard patterns, and performing a multi-pass print operation using these patterns has been described. However, a thinning method of print data is not limited to this.

In the above embodiments, the print duty detecting means and the print ink density predicting means are arranged at the input side of the thin-print data forming means. However, these means may be arranged at the output side of the thin-print data forming means. Alternatively, the above-mentioned means may be arranged at both the input and output sides of the thin-print data forming means to detect a print duty and to predict a print ink density, thereby finely controlling multi-pass intervals according to these signals. Thus, further remarkable effects can be provided.

In the above embodiments, the multi-pass interval control is performed using one parameter. However, it is more effective that the multi-pass interval is finely controlled using some of a (unit color) print duty signal, a (mixed color) print ink density signal, and a relative humidity signal.

Furthermore, the above embodiments may be combined with multi-pass interval control based on a difference in types of recording media (a PPC paper sheet, an ink jet coat sheet, and the like) and a difference in recording modes (a two-pass mode, a four-pass mode, and the like).

In the fourth embodiment, control is made using the maximum print duty. Alternatively, control may be made by detecting an average value in one line.

In the sixth embodiment, a means for detecting not only the relative humidity but also the temperature may be used, and the multi-pass interval may be finely controlled based on both the relative humidity and the temperature near a recording unit, thus providing further remarkable effects.

In this manner, a recording interval used when a desired image is obtained by recording thin images a plurality of number of times on a single region of a recording medium is properly controlled according to a predetermined condition such as the print duty, environmental condition, and the like. Therefore, a high-quality image free from blurring can be obtained without decreasing the throughput.

[Others]

The present invention brings about excellent effects particularly in a recording head and a recording device of a system, which comprises means (e.g., an electrothermal converting element, laser light, and the like) for generating heat energy as energy utilized for execution of ink ejection, and causes a change in state of an ink by the heat energy, among the ink jet recording systems. According to this system, a high-density and high-definition recording operation can be attained.

As to its representative construction and principle, for example, one practiced by use of the basic principle disclosed in, for instance, U.S. Pat. Nos. 4,723,129 and 4,740,796 is preferred. The above system is applicable to either one of the so-called on-demand type and the continuous type. Particularly, the case of the on-demand type is effective because, by applying at least one driving signal which gives rapid temperature elevation exceeding nucleate boiling corresponding to the recording information on electrothermal converting elements arranged in a range corresponding to the sheet or liquid channels holding liquid (ink), heat energy is generated by the electrothermal converting elements to effect film boiling on the heat acting surface of the recording head, and consequently the bubbles within the liquid (ink) can be formed in correspondence to the driving signals one by one. By ejecting the liquid (ink) through an ejection port by growth and shrinkage of the bubble, at least one droplet is formed. By making the driving signals into pulse shapes, growth and shrinkage of the bubble can be effected instantly and adequately to more preferably accomplish ejection of the liquid (ink) particularly excellent in response characteristics. As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of an ejection orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in Japanese Laid-Open Patent Application No. 59-123670 which discloses the construction using a slit common to a plurality of electrothermal converting elements as an ejection portion of the electrothermal converting element or Japanese Laid-Open Patent Application No. 59-138461 which discloses the construction having the opening for absorbing a pressure wave of heat energy in correspondence with the ejection portion. More specifically, according to the present invention, recording can be reliably performed with high efficiency regardless of constructions of recording heads.

Furthermore, the present invention can be effectively applied to a full-line type recording head having a length corresponding to the maximum width of a recording medium, which can be used in recording of a recording apparatus. Such a recording head may have an arrangement which satisfies the length by combining a plurality of recording heads, or an arrangement as a single recording head which is formed integrally.

In addition, of the above serial type recording heads, the present invention is effective for a recording head fixed to an apparatus main body, a recording head of the freely exchangeable chip type which enables electrical connection to the apparatus main body or supply of ink from the apparatus main body by being mounted onto the apparatus main body, or for the case by use of a recording head of the cartridge type, which has an ink tank provided integratedly on the recording head itself.

It is also preferable to add a restoration means for the recording head, preliminary auxiliary means, and the like provided as a construction of the recording apparatus of the invention because the effect of the present invention can be further stabilized. Specific examples of them may include, for the recording head, capping means, cleaning means, pressurization or aspiration means, and electrothermal converting elements or another heating element or preliminary heating means according to a combination of them. It is also effective for stable recording to realize the preliminary ejection mode which executes ejection separately from recording.

Moreover, in the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink jet system so that the ink viscosity can fall within a stable ejection range. In addition, a temperature rise caused by heat energy may be prevented by positively utilizing the temperature rise as energy for a change in state from a solid state to a liquid state of the ink, or an ink which is solidified in a non-use state for the purpose of preventing evaporation of the ink may be used. In any case, the present invention can be applied to a case wherein an ink, which can be liquefied by heat energy such as an ink which is liquefied upon application of heat energy according to a recording signal, and is ejected in a liquid state, an ink which begins to be solidified when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electrothermal converting elements. In the present invention, the above-mentioned film boiling system is most effective for the above-mentioned inks.

In addition, the ink jet recording apparatus of the present invention may be used as an image output terminal of an information processing equipment such as a computer, or a copying machine as a combination of the recording apparatus, a reader, and the like, or a facsimile apparatus having a transmission/reception function.

What is claimed is:

1. An ink jet recording method of recording an image by ejecting ink droplets from a recording device comprising a plurality of ejection elements to a recording medium, said method for completing the image on a predetermined area of the recording medium by successively recording thinned images according to plural mutually complementary thinning patterns onto the predetermined area, said method comprising the steps of:

provinding a control table storing a plurality of interval time periods between recordings of the thinned images, the plurality of interval time periods corresponding to a plurality of levels of a predetermined condition;

recording in a first recording step a thinned image onto the predetermined area of the recording medium by driving the recording device on a basis of an image signal thinned according to a first thinning pattern of the plural thinning patterns;

determining whether a predetermined interval time period has elapsed since said first recording step was effected, the predetermined interval time period being one of the plurality of interval time periods and determined from said control table in accordance with a level of the predetermined condition; and recording in a second recording step a thinned image onto the predetermined area of the recording medium by driving the recording device on a basis of an image signal thinned according to a second thinning pattern of the plural thinning patterns, after it is determined in said determining step that the predetermined interval time period has elapsed.

2. A method according to claim 1, wherein the predetermined interval time period is selected from the plurality of interval time periods stored in said control table in accordance with a print duty of the image data to be recorded by the recording device.

3. A method according to claim 1 or 2, wherein an environmental condition near the recording device is detected, and the predetermined interval time period is selected from the plurality of interval time periods stored in said control table in accordance with the detected environmental condition.

4. A method according to claim 3, wherein at least one of a temperature and a relative humidity near the recording device is detected as the environmental condition.

5. A method according to claim 4, wherein the recording device ejects the ink by causing a change in state in the ink by heat energy.

6. A method according to claim 4, wherein the thinned images are recorded by moving the recording device relative to the recording medium a plurality of number of times.

7. A method according to claim 6, wherein the recording device ejects the ink by causing a change in state in the ink by heat energy.

8. A method according to claim 1 or 2, wherein the thinned images are recorded by moving the recording device relative to the recording medium a plurality of number of times.

9. A method according to claim 8, wherein the recording device ejects the ink by causing a change in state in the ink by heat energy.

10. A method according to claim 3, wherein the thinned images are recorded by moving the recording device relative to the recording medium a plurality of number of times.

11. A method according to claim 10, wherein the recording device ejects the ink by causing a change in state in the ink by heat energy.

12. A method according to claim 1 or 2, wherein the recording device ejects the ink by causing a change in state in the ink by heat energy.

13. A method according to claim 3, wherein the recording device ejects the ink by causing a change in state in the ink by heat energy.

14. An ink jet recording method of performing color image recording using a plurality of recording devices for ejecting mutually different color inks, said method comprising the steps of:

providing a control table storing a plurality of time intervals for performing a recording operation, the plurality of time intervals corresponding to a plurality of levels of print duties;

determining time intervals for performing a recording operation from the plurality of time intervals stored in the control table in accordance with levels of print duties of respective color image data for the plurality of recording devices; and performing the recording operation a plurality of number of times for a predetermined area, the recording operation being successively performed at the time intervals determined in said determining step.

15. A method according to claim 14, wherein in each of the plurality of number of times of recording operations, an image thinned according to a predetermined thinning pattern is recorded.

16. A method according to claim 15, wherein the plurality of recording devices are moved relative to a recording medium for each recording operation, and the time intervals each comprise an interval between the relative movements.

17. A method according to any one of claims 14 to 16, wherein each of the recording devices ejects the ink by causing a change in state in the ink by heat energy.

18. An ink jet recording apparatus for completing an image on a predetermined area of a recording medium by successively recording thinned images according to plural mutually complementary thinning patterns onto the predetermined area, said apparatus comprising:

recording means for ejecting ink droplets onto the recording medium, said recording means comprising a plurality of ejection elements;

data generation means for generating first image data thinned according to a first thinning pattern of the plural thinning patterns and second image data thinned according to a second thinning pattern of the plural thinning patterns;

control means for controlling said recording means to sequentially perform on a predetermined area of the recording medium a first image recording based on the first image data generated from said data generation means and a second image recording based on the second image data; and setting means for setting a time interval from among a plurality of time intervals between the first image recording and the second image recording, said setting means including a control table storing the plurality of time intervals between the first image recording and the second image recording, said plurality of time intervals corresponding to a plurality of levels of predetermined conditions, said setting means setting the time interval between the first image recording and the second image recording in accordance with a level of one of the plurality of predetermined conditions.

19. An apparatus according to claim 18, wherein said setting means comprises detection means for detecting a print duty of image data for the predetermined area, and the time interval is variably set in accordance with the print duty detected by said detection means.

20. An apparatus according to claim 19, wherein when the print duty detected by said detection means exceeds a predetermined value, said setting means sets the time interval to be a first time interval, and when the print duty is less than the predetermined value, said setting means sets the time interval to be a second time interval which is shorter than the first time interval.

21. An apparatus according to claim 18 wherein said setting means comprises detection means for detecting an environmental condition near a recording position of said recording means, and changes the time interval in accordance with a detection signal from said detection means.

22. An apparatus according to claim 21, wherein said detection means detects at least one of a temperature and a relative humidity near the recording position.

23. An apparatus according to any one of claims 18 to 22, further comprising moving means for moving said recording means relative to the recording medium, wherein a thinned image according to the first image data and a thinned image according to the second image data are recorded on the recording medium by effecting relative movement with said moving means.

24. An apparatus according to claim 23, wherein said setting means sets the time interval between the relative movements by said moving means.

25. An apparatus according to claim 24, wherein said recording means ejects the ink by causing a change in state in the ink by heat energy.

26. An apparatus according to claim 23, wherein said recording means ejects the ink by causing a change in state in the ink by heat energy.

27. An apparatus according to any one of claims 18 to 22, wherein said recording means ejects the ink by causing a change in state in the ink by heat energy.

28. An ink jet recording apparatus comprising:

a plurality of recording means for ejecting ink droplets in mutually different colors to a recording medium, each of said recording means comprising a plurality of ejection elements;

data generation means for generating a plurality of sets of thinning image data corresponding to a plurality of thinning patterns for the respective colors, the plurality of thinning patterns being mutually complementary;

control means for controlling said plurality of recording means to sequentially perform on a predetermined area of the recording medium a plurality of thinned image recordings based on the plurality of sets of thinning image data for the respective colors; and setting means for setting a time interval between the plurality of thinned image recordings, the time interval being one of a plurality of time intervals for performing a recording operation, said setting means including a control table storing the plurality of time intervals, the plurality of time intervals corresponding to a plurality of levels of print duties of the sets of thinning image data, and said setting means setting the time interval in accordance with the levels of print duties of the sets of thinning image data for the respective colors to be recorded on the predetermined area of the recording medium.

29. An apparatus according to claim 28, further comprising moving means for moving said plurality of recording means relative to the recording medium, wherein the plurality of thinned images for the respective colors are recorded on the recording medium by performing relative movement with said moving means.

30. An apparatus according to claim 28, wherein said setting means sets the time interval between the relative movements by said moving means.

31. An apparatus according to any one of claims 28 to 30, wherein each of said recording means ejects the ink by causing a change in state in the ink by heat energy.

* * * * *

UNITED STATES PATENT AND TRADEMARK OFFICE
CERTIFICATE OF CORRECTION

PATENT NO. : 5,917,519

DATED : June 29, 1999

INVENTOR(S) : ATSUSHI ARAI, ET AL.   Page 1 of 2

It is certified that error appears in the above-identified patent and that said Letters Patent is hereby corrected as shown below:

On title page,

References Cited [56]

FOREIGN PATENT DOCUMENTS

"1120356    5/1989    Japan" should read
--1-120356    5/1989    Japan--.

COLUMN 1

Line 46, "-checkerboard" should read --checkerboard--.

COLUMN 5

Line 22, "With" should read --with--.

COLUMN 9

Line 8, "3 sec." should read --3 sec,--.

UNITED STATES PATENT AND TRADEMARK OFFICE
CERTIFICATE OF CORRECTION

PATENT NO. : 5,917,519

DATED : June 29, 1999

INVENTOR(S) : ATSUSHI ARAI, ET AL.

It is certified that error appears in the above-identified patent and that said Letters Patent is hereby corrected as shown below:

COLUMN 18

Line 60, "claim 18" should read --claim 18,--.

Signed and Sealed this

Eleventh Day of July, 2000

Attest:

Q. TODD DICKINSON

*Attesting Officer*  *Director of Patents and Trademarks*